(12) United States Patent
Le Saint et al.

(10) Patent No.: US 10,826,712 B2
(45) Date of Patent: Nov. 3, 2020

(54) CONFIDENTIAL AUTHENTICATION AND PROVISIONING

(71) Applicant: VISA INTERNATIONAL SERVICE ASSOCIATION, San Francisco, CA (US)

(72) Inventors: Eric Le Saint, Los Altos, CA (US); Jing Jin, San Jose, CA (US); Christian Aabye, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 391 days.

(21) Appl. No.: 15/577,898

(22) PCT Filed: Jun. 30, 2016

(86) PCT No.: PCT/US2016/040586
§ 371 (c)(1),
(2) Date: Nov. 29, 2017

(87) PCT Pub. No.: WO2017/004466
PCT Pub. Date: Jan. 5, 2017

(65) Prior Publication Data
US 2018/0167208 A1    Jun. 14, 2018

Related U.S. Application Data

(60) Provisional application No. 62/187,125, filed on Jun. 30, 2015.

(51) Int. Cl.
*H04L 9/32* (2006.01)
*H04L 9/14* (2006.01)
(Continued)

(52) U.S. Cl.
CPC .......... *H04L 9/3273* (2013.01); *H04L 9/0844* (2013.01); *H04L 9/0869* (2013.01);
(Continued)

(58) Field of Classification Search
CPC ..... H04L 9/08; H04L 9/14; H04L 9/32; H04L 63/04; H04L 63/06; H04L 63/08;
(Continued)

(56) References Cited

U.S. PATENT DOCUMENTS 6,052,467 A    4/2000  Brands
7,039,713 B1   5/2006  Van Gunter et al.
(Continued)

FOREIGN PATENT DOCUMENTS

CN    1841997    10/2006
CN    1878060    12/2006
(Continued)

OTHER PUBLICATIONS

EP17207282.9 , "Extended European Search Report", dated May 29, 2018, 10 pages.
(Continued)

*Primary Examiner* — Alexander Lagor
*Assistant Examiner* — Kalish K Bell
(74) *Attorney, Agent, or Firm* — Kilpatrick Townsend & Stockton LLP

(57) ABSTRACT

Some embodiments provide systems and methods for confidentially and securely provisioning data to an authenticated user device. A user device may register an authentication public key with an authentication server. The authentication public key may be signed by an attestation private key maintained by the user device. Once the user device is registered, a provisioning server may send an authentication request message including a challenge to the user device. The user device may sign the challenge using an authentication private key corresponding to the registered authentication public key, and may return the signed challenge to the provisioning server. In response, the provisioning server may provide provisioning data to the user device. The
(Continued)

registration, authentication, and provisioning process may use public key cryptography while maintaining confidentiality of the user device, the provisioning server, and then authentication server.

22 Claims, 7 Drawing Sheets

(51) Int. Cl.
| | |
|---|---|
| H04L 9/08 | (2006.01) |
| G06F 21/44 | (2013.01) |
| G06F 16/00 | (2019.01) |
| G06F 21/33 | (2013.01) |
| G06F 21/45 | (2013.01) |
| G06F 21/57 | (2013.01) |
| G06F 21/62 | (2013.01) |
| H04L 29/06 | (2006.01) |

(52) U.S. Cl.
CPC .............. *H04L 9/14* (2013.01); *H04L 9/3242* (2013.01); *H04L 9/3265* (2013.01); *H04L 9/3268* (2013.01); *H04L 63/0428* (2013.01); *H04L 63/0442* (2013.01); *H04L 63/061* (2013.01); *H04L 63/0869* (2013.01); *H04L 2209/04* (2013.01); *H04L 2209/08* (2013.01); *H04L 2209/38* (2013.01); *H04L 2209/56* (2013.01)

(58) Field of Classification Search
CPC ......... H04L 63/10; H04L 63/20; G06F 16/00; G06F 21/33; G06F 16/45; G06F 16/57; G06F 16/62
See application file for complete search history.

(56) References Cited

U.S. PATENT DOCUMENTS

| | | | |
|---|---|---|---|
| 9,288,208 B1* | 3/2016 | Roth | H04L 63/0884 |
| 10,333,903 B1* | 6/2019 | Campagna | H04L 63/061 |
| 2002/0067832 A1 | 6/2002 | Jablon | |
| 2002/0104006 A1 | 8/2002 | Boate et al. | |
| 2005/0154889 A1* | 7/2005 | Ashley | H04L 63/0435 |
| | | | 713/171 |
| 2006/0288209 A1* | 12/2006 | Vogler | H04L 9/0844 |
| | | | 713/168 |
| 2007/0266258 A1* | 11/2007 | Brown | H04L 9/0822 |
| | | | 713/183 |
| 2008/0141035 A1 | 6/2008 | Furukawa et al. | |
| 2009/0006860 A1* | 1/2009 | Ross | H04L 63/126 |
| | | | 713/189 |
| 2009/0287837 A1 | 11/2009 | Felsher | |
| 2010/0100740 A1 | 4/2010 | Ho et al. | |
| 2011/0307698 A1 | 12/2011 | Vanstone | |
| 2012/0082312 A1 | 4/2012 | Liu et al. | |
| 2012/0087493 A1 | 4/2012 | Chidambaram et al. | |
| 2012/0221858 A1 | 8/2012 | Struik et al. | |
| 2012/0331287 A1* | 12/2012 | Bowman | H04L 9/3273 |
| | | | 713/156 |
| 2013/0262856 A1 | 10/2013 | Moshfeghi et al. | |
| 2013/0301828 A1 | 11/2013 | Gouget et al. | |
| 2013/0311769 A1 | 11/2013 | Hayes | |
| 2014/0281500 A1 | 9/2014 | Ignatchenko | |
| 2014/0365776 A1 | 12/2014 | Smets et al. | |
| 2015/0124961 A1 | 5/2015 | Brown et al. | |
| 2015/0195278 A1* | 7/2015 | Plotkin | H04L 63/0861 |
| | | | 713/186 |
| 2015/0200774 A1* | 7/2015 | Le Saint | H04L 9/0819 |
| | | | 713/171 |
| 2016/0269403 A1* | 9/2016 | Koutenaei | H04L 63/0861 |

FOREIGN PATENT DOCUMENTS

| | | |
|---|---|---|
| CN | 103477585 | 12/2013 |
| CN | 103621040 | 3/2014 |
| CN | 104463576 | 3/2015 |
| CN | 107852404 A | 3/2018 |
| RU | 2202827 | 4/2003 |
| RU | 2008101462 | 7/2009 |
| RU | 2446606 | 3/2012 |
| WO | 2013183940 | 12/2013 |
| WO | 2016033610 | 3/2016 |
| WO | 2017004470 | 6/2017 |

OTHER PUBLICATIONS

EP16818853.0 , "Extended European Search Report", dated Jan. 23, 2019, 10 pages.
EP16818857.1 , "Extended European Search Report", dated May 14, 2018, 10 pages.
Garrett et al., "Blinded Diffie-Hellman Preventing Eavesdroppers from Tracking Payments", EMVCo Security Working Group, Security Standardisation Research, Available online at: www.emvco.com, Dec. 16, 2014, pp. 79-92.
AU2016287728 , "First Examination Report", Dec. 13, 2019, 3 pages.
AU2016287732 , "First Examination Report", Feb. 3, 2020, 4 pages.
Duncan et al., "Blinded Diffie-Hellman", ECCV 2016 Conference, Lecture Notes in Computer Science, Springer, Dec. 16, 2014, pp. 79-92.
RU2018103181 , "Office Action", dated Dec. 30, 2019, 19 pages.
RU2018103183 , "Office Action", dated Dec. 17, 2019, 21 pages.
U.S. Appl. No. 15/736,243 , "Notice of Allowance", dated Mar. 4, 2020, 18 pages.
EP16818853.0 , "Office Action", dated Feb. 27, 2020, 6 pages.
EP17207282.9 , "Office Action", dated Feb. 28, 2020, 4 pages.
CN201680038929.0 , "Office Action", dated Apr. 20, 2020, 24 pages.
PCT/US2016/040586 , "International Search Report and Written Opinion", Oct. 14, 2016, 17 pages.
PCT/US2016/040590 , "International Search Report and Written Opinion", Sep. 12, 2016, 18 pages.

* cited by examiner

CONFIDENTIAL AUTHENTICATION AND PROVISIONING

CROSS-REFERENCES TO RELATED APPLICATIONS

The present application claims priority from U.S. Provisional Application No. 62/187,125, entitled "CONFIDENTIAL TOKEN PROVISIONING" and filed on Jun. 30, 2015, the entire contents of which are hereby incorporated by reference for all purposes. The present application is similar to U.S. application Ser. No. 14/595,792, entitled "EFFICIENT METHODS FOR PROTECTING IDENTITY IN AUTHENTICATED TRANSMISSIONS" and filed on Jan. 13, 2015, and U.S. application Ser. No. 14/743,874, entitled "EFFICIENT METHODS FOR AUTHENTICATED COMMUNICATION" and filed on Jun. 18, 2015, the entire contents of which are hereby incorporated by reference for all purposes.

BACKGROUND

As user devices such as mobile phones continue to increase in popularity, ensuring that data is securely provisioned to user devices continues to be a concern. For instance, in order to provision data onto a user device, it may be necessary to authenticate a user prior to transmitting provisioning data. However, an attacker may attempt to eavesdrop on the registrations, authentication, and provisioning processes (e.g., by conducting a man-in-the-middle attack). Thus, an attacker may attempt to intercept data, such as a public key, that can be used to infer the identity of a user, a user device, or a server computer. An attacker may also attempt to intercept authentication data, such as a password or response to a challenge. The intercepted data could be used to track the user device or it may be used for illicit purposes.

Further complicating matters is the prior state of the user device. In some cases, the user device may not previously store a digital certificate for a provisioning server—in other words, the user device may not trust a priori the provisioning server. Conducting secure and authenticated provisioning in such circumstances may pose a challenge.

Embodiments of the present invention address these and other problems individually and collectively.

BRIEF SUMMARY

Some embodiments of the invention relate to systems and methods for securely authenticating a user device. A user device may be authenticated by an authentication server. The user device may have previously registered a user device authentication public key of the user device with the authentication server. To authenticate the user device, the authentication server may send an authentication challenge to the user device. The authentication server may encrypt the authentication challenge prior to sending it to the user device. The user device may decrypt the authentication challenge to obtain the authentication challenge.

In some embodiments, the user device may sign the authentication challenge using a user device authentication private key corresponding to the user device authentication public key. The user device may generate a first shared secret using the user device authentication private key corresponding to the user device authentication public key and an authentication server public key of the authentication server. The user device may encrypt an authentication response including the challenge using the first shared secret to obtain an encrypted authentication response.

In some embodiments, the encrypted authentication response may include the signed challenge. The user device may send the encrypted authentication response to the authentication server. The authentication server may receive the encrypted authentication response from the user device and generate the first shared secret using an authentication server private key corresponding to the authentication server public key and the user device authentication public key. The authentication server may decrypt the encrypted authentication response using the first shared secret to obtain an authentication response including the challenge. The authentication server may authenticate the user device based on the decrypted authentication response. In some embodiments, the authentication server may verify the signed challenge using the user device authentication public key.

Other embodiments are directed to systems, portable consumer devices, and computer readable media associated with methods described herein.

A better understanding of the nature and advantages of embodiments of the present invention may be gained with reference to the following detailed description and the accompanying drawings.

TERMS

Figure 1:
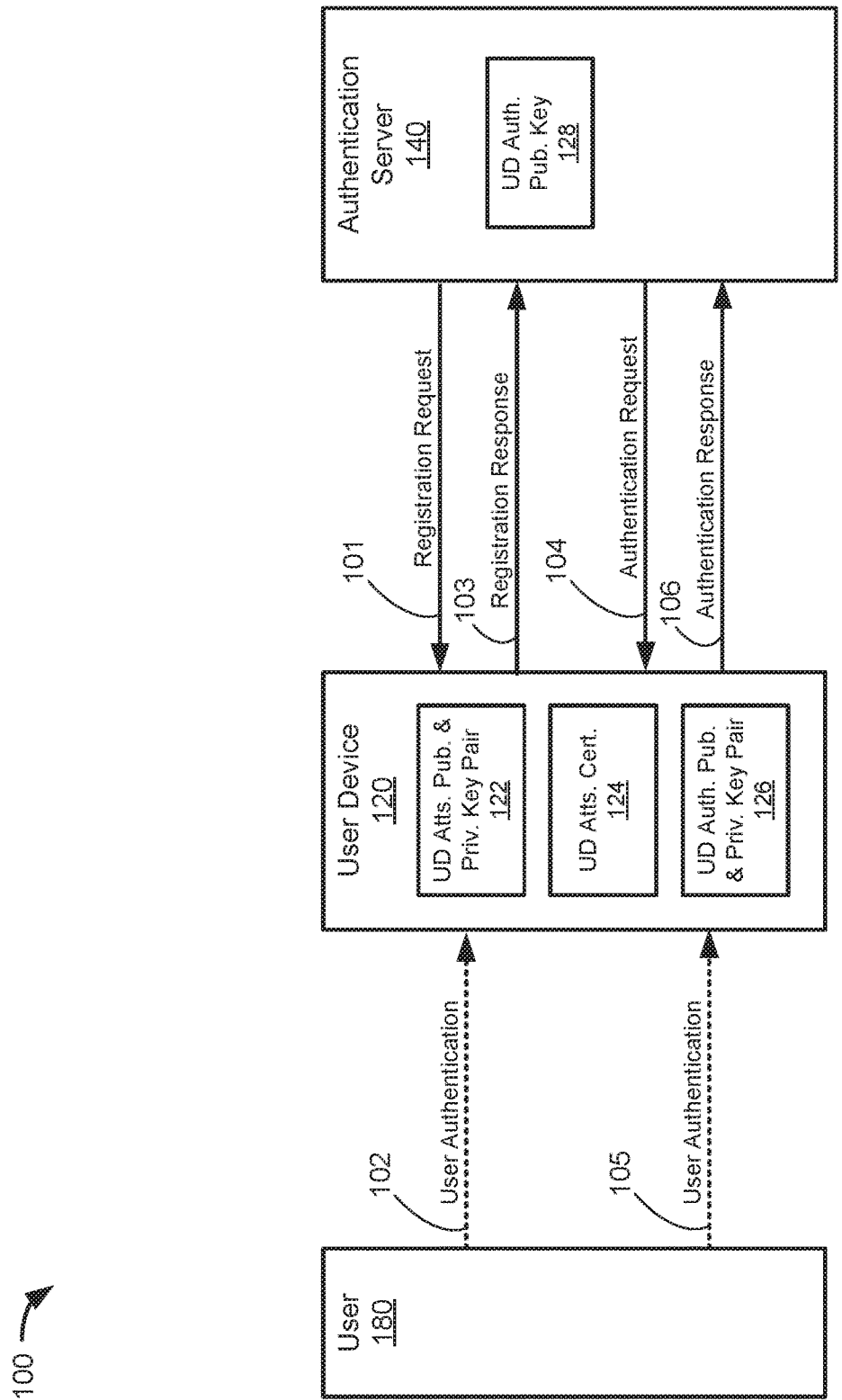
FIG. 1 shows a message flow diagram for registration and authentication of a user device with an authentication server, in accordance with some embodiments.

Prior to discussing embodiments of the invention, description of some terms may be helpful in understanding embodiments.

The term "server computer" may include a computer or cluster of computing devices. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "public/private key pair" may include a pair of linked cryptographic keys generated by an entity (e.g., a computer or an electronic device). The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value by combination with another data element, such as a cryptographic nonce. For example, in elliptic curve cryptography, a public key may be multiplied by the nonce to generate a "blinded public key." Similarly, a private key may be multiplied by the nonce to generate a "blinded private key." The nonce may have the same bit-length as the public key and the private key.

An "ephemeral key pair" may include a public key (i.e., an "ephemeral public key") and a private key (i.e., an "ephemeral private key) generated for use with a single transaction or other communication session. The ephemeral key pair may be of any suitable format, such as ECC or RSA. Typically, an ephemeral key pair may is deleted once the transaction or communication session has concluded.

A "static key pair" may include a public key (i.e., a "static public key") and a private key (i.e., a "static private key") maintained over a period of time. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. For example, a first computer may generate a first key pair include a first public key and a first private key. A second computer may generate a second key pair including a second public key and a second private key. The first computer may generate a shared secret using the second public key of the second computer and the first private key of the first computer. The second computer may generate the same shared secret using the first public key of the first computer and the second private key of the second computer. The first computer and the second computer may both use the shared secret to generate a session key.

The term "identification data" may include any data or information associated with a user or device. Examples of identification data may include a name of a user associated with the device, an organization associated with the device, payment information such as a primary account number (PAN) associated with the device, an expiration date of the device, a certificate associated with the device, an IMEI or serial number of the device, etc.

The term "authentication" generally refers to a process of establishing confidence in the identity of a user or a computer. Certain electronic authentication systems may require a user to input authentication information (e.g., a password, a personal identification number (PIN), or other similar information) for authentication of the user. For example, a user may request access to a website by entering a user ID and a PIN into their user device, which communicates the user ID and PIN to a server hosting the website. The server may authenticate the user my comparing the user ID and PIN received from the user device to a stored PIN corresponding to that user ID. Authentication may also be performed by confirming the identity of a device through the use of public key cryptography and through the use of digital signatures.

The term "authentication data" or "authentication information" may include any data or information suitable to authenticate a user or device. Examples of authentication data may include a password or passphrase, a secret key (e.g., a private key), a digital signature, an indication that the device is storing certain information, etc.

The term "provisioning" generally refers to a process for requesting and receiving data. For example, a user device (e.g., a computer or a mobile device) may request data from a provisioning server to be stored on the user device. The provisioning server may send data to the user device may be based on certain criteria or rules. The provisioning server may send the data to the user device based on identifying the user device. The data provisioned to the user device from the provisioning server may generally be referred to as "provisioning data." The provisioning data may be communicated using a channel established based on a public key identifying the user device.

An "identification factor" may include any data or information determined from identification data and/or authentication data. Typically, though not necessarily, the identification factor may be generated by hashing a combination of identification data and authentication data.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

A "session key" may include any key used to encrypt or decrypt data to be securely communicated. In some cases, a session key may be generated from a shared secret known both to a sending entity and a receiving entity. For example, the session key may be derived using a key derivation function and the shared secret.

DETAILED DESCRIPTION

Some embodiments of the invention relate to authentication systems and methods, provisioning systems and methods, and integrated authentication and provisioning systems.

I. Authentication

User devices (e.g., computers and mobile phones) may be used to access sensitive data and receive sensitive data. Such sensitive data may require an authentication process to ensure that unauthorized users do not access it. Authorization generally refers to a process of establishing confidence in the identity of a user. Certain electronic authentication systems may require a user to input authentication information (e.g., a password, a personal identification number (PIN), or other similar information) for authentication of the user. For example, a user may request access to a website by entering a user ID and a PIN into their user device, which communicates the user ID and PIN to a server hosting the website. The server may authenticate the user my comparing the user ID and PIN received from the user device to a stored PIN corresponding to that user ID. As such, the user device may only access the data if the user is authenticated. However, such authentication systems require the authentication information to be input at user device and stored at the server. Such systems may be vulnerable to a data breach, where an unauthorized party gains access to the stored authentication information at either the user device or the server.

In addition, such systems may be vulnerable to eavesdropping on the communications (e.g., by conducting a man-in-the-middle attack). Thus, an attacker may attempt to intercept identification data used to infer the identity of a user device or a server computer, or authentication data, such as a password or response to a challenge, transmitted by the user. If determined, this data could be used for illicit purposes. Further complicating matters is the prior state of the user device. In some cases, the user device may not previously store a digital certificate for a provisioning server—in other words, the user device may not trust a priori the provisioning server. Conducting secure and authenticated provisioning in such circumstances may pose a challenge.

Certain authentication systems may perform authentication without transmitting passwords, PINs, or similar authentication information to a server over a network in order to address the issues discussed above. For example, instead of the user device transmitting a user-input authentication information (e.g., password, PIN, or biometric data) to an online server, the user may authenticate with the user device by inputting the authentication information and the user device may authenticate with the server using public key cryptography.

FIG. 1 shows a message flow diagram 100 for registration and authentication of a user device 120 with an authentication server 140, in accordance with some embodiments. The user device 120 may comprise a computing device operated by or associated with a user 180. For example, the user devices 120 may be a mobile device, a payment devices (e.g., smart cards), a wearable device, a personal computer, etc. The authentication server 140 may be a server computer, or cluster of server computers, coupled to one or more databases. An authorization process may be performed, for example, when the user 180 of the user device 120 requests data or attempts to access a website maintained by a webserver (not shown) that requires authentication by the authentication server 140. In order to authenticate with the authentication server 140, the user device 120 must first perform registration with the authentication server 140.

In performing registration, at 101, the authentication server 140 may send a registration request to the user device 120 (e.g., over a network). The registration request may include parameters specifying authentication criteria for authentication of the user 180. The registration request may also include a challenge. The registration request may be passed from the authentication server 140 through the webserver to the user device 120.

In response to receiving the registration request, the user device 120 may prompt the user 180 to authenticate themselves. The user device 120 may require authentication of the user 180 based on the authentication criteria of the registration request. At 102, the user 180 may input authentication information into the user device 120. For example, the user 180 may input authentication information including at least one of a user identifier, a password, a passcode, a PIN, a fingerprint scan, a retinal scan, or other biometric data. In response to receiving the authentication information input by the user 180, the user device 120 may generate a user device authentication key pair ("UD Auth. Pub. & Priv. Key Pair") 126. The user device authentication key pair 126 includes a user device authentication public key ("UD Auth. Pub. Key") 128 and a user device authentication private key corresponding to the user device authentication public key. The user device authentication key pair 126 may be uniquely identified with the user 180 and the authentication information input by the user 180. The user device 120 may store the user device authentication key pair 126 (e.g., in a memory circuit).

Prior to registration, the user device 120 may store (e.g., in a memory circuit) a user device attestation key pair ("UD Atts. Pub. & Priv. Key Pair") 122 including a user device attestation public key and a user device attestation private key corresponding to the user device attestation public key. For example, the user device attestation key pair 122 may be installed by an original equipment manufacturer during manufacture of the user device 120. The user device 120 may also store a user device attestation certificate ("UD Atts. Cert.") 124. The user device attestation certificate 124 may include a user device attestation public key. The user device attestation public key of the user device attestation certificate 124 may be used to verify data that is signed using the user device attestation private key. The user device attestation certificate 124 may be signed by a trusted certificate authority ("CA"). The user device attestation certificate 124 may be verified using a CA public key of the CA corresponding to a CA private key of the CA used to signed the user device attestation certificate 124. For example, the user device attestation certificate 124 may be installed by the original equipment manufacturer during manufacture of the user device 120.

The user device 120 may sign the user device authentication public key 128 using the user device attestation private key. That is, the user device 120 may generate a signed user device authentication public key including a signature. The user device 120 may generate a registration response including the signed user device authentication public key 128 and the user device attestation certificate 124. The registration response may also include the user device authentication public key 128, the user device attestation certificate 124, and a signature. The user device 120 may generate the signature by signing over the user device authentication public key 128 and the challenge of the registration request. At 103, the user device 120 may send the registration response to the authentication server 140 (e.g., over a network). The registration response from the user device 120 may be passed through the webserver (not shown) to the authentication server 140.

Prior to registration. the authentication server 140 may store the CA public key (e.g., in a memory circuit). The authentication server 140 may verify the user device attestation certificate using the CA public key. Then authentication server 140 may then verify the user device authentication public key 128, which was signed by the user device 120 using the user device attestation private key, using the user device attestation public key of the user device attestation certificate 124. The authentication server 140 may store the user device authentication public key 128 (e.g., in a memory circuit). Thus, the user device 120 has registered the user device authentication public key 128 with the authentication server 140 such that it may be used for authentication of the user device 120.

After registration, the user 180 of the user device 120 may perform an authentication process to request the data or to access the website discussed above with respect to registration. At 104, the authentication server 140 may send an authentication request to the user device 120 (e.g., over a network). The authentication request may be passed through the webserver. The authentication request may include an authentication challenge. In response to receiving the authentication request, the user device 120 may prompt the user 180 to authenticate themselves. At 105, the user 180 may input the authentication information used during registration into the user device 120. In response to receiving the authentication information input by the user 180, the user device 120 may identify the user device authentication key pair 126 generated during registration by matching the authentication information input by the user 180. The user device 120 may sign the authentication challenge using the user device authentication private key corresponding to the user device authentication public key 128, which has been registered with the authentication server 140, to obtain a signed authentication challenge. The signed authentication challenge includes a signature of the authentication challenge that may be verified using the user device authentication public key.

The user device 120 may generate an authentication response including the signed authentication challenge. At 106, the user device 120 may send the authentication response to the authentication server 140 (e.g., over a network). The authentication response may be passed through a webserver. The authentication server 140 may verify the signed challenge of the authentication response using the user device authentication public key 128 stored at the authentication server 140 during registration. The authentication server 140 may send an indication to the webserver that the signature of the user device 120 has been verified and the webserver may provide the data or the website requested by the user device 120 to the user device 120.

Thus, the user 180 authenticates with the user device 120 by inputting the authentication information (e.g., a PIN or biometric data) to the user device 120 and the user device 120 authenticates with the authentication server 140 by signing an authentication challenge using the user device authentication private key corresponding to the user device authentication public key 128 registered with the authentication server 140.

II. Provisioning

Provisioning generally refers to a process for requesting and receiving data. For example, a user device (e.g., computers and mobile phones) may request data from a provisioning server to be stored on the user device. The provisioning server may send data to the user device may be based on certain criteria or rules. The data may be communicated using a channel established based on a public key identifying the user device. During provisioning, even if communications are encrypted or otherwise protected, the identity of the user device or a user or the user device may be determined. If determined, the identity could be used for illicit purposes.

Figure 2:
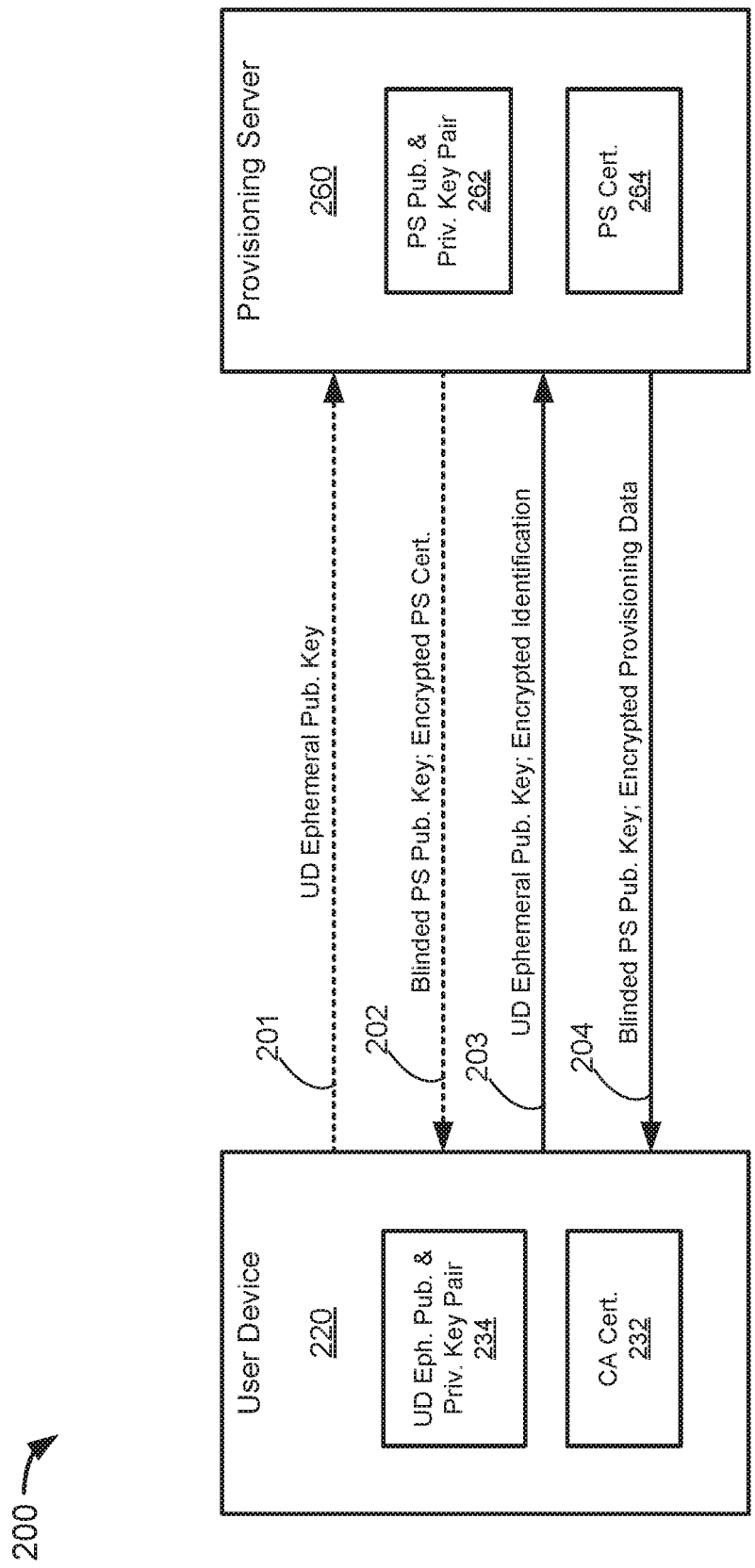
FIG. 2 shows a message flow diagram for confidentially provisioning data from a provisioning server to a user device, in accordance with some embodiments.

FIG. 2 shows a message flow diagram 200 for confidentially provisioning data from a provisioning server 260 to a user device 220, in accordance with some embodiments. Although FIG. 2 shows the steps as being performed by user device 220 and provisioning server 260, some or all steps may be performed by another suitable entity, such as an authentication server. The steps in the message flow diagram 200 may also be performed in a different order or in another suitable manner.

The user device 220 may comprise a computing device operated by or associated with a user. For example, the user devices 120 may be a mobile device, a payment devices (e.g., smart cards), a wearable device, a personal computer, etc. The user device 220 of FIG. 2 may operate similarly to the user device 120 of FIG. 1. The provisioning server 260 may be a server computer, cluster of server computers, or a webserver coupled to one or more databases. Provisioning server 260 may provision data to the user devices 220. For example, the provisioning data may include account information, identification information, documents, payment credentials, or other data or information. In some embodiments, the provisioning server 260 may be implemented using one or more server computers and/or other computing devices.

Prior to the message flow 200, the user device 220 may store (e.g., in a memory circuit) a certificate authority (CA) root certificate ("CA Cert.") 232 including a CA root public key. Prior to the message flow 200, the provisioning server 260 may maintain a provisioning server key pair ("PS Priv. & Pub. Key Pair") 262 including a provisioning server public key and a provisioning server private key corresponding to the provisioning server public key. The provisioning server 260 may also maintain a provisioning server certificate ("PS Cert.") comprising the provisioning server public key. The provisioning server certificate 252 may be signed by the CA root public key.

In order to encrypt communications between the user device 220 and the provisioning server 260, the user device 220 may generate a shared secret using a private key of the user device 220 and a public key of the provisioning server 260. The provisioning server 260 may generate the same shared secret using a private key of the provisioning server and a public key of the user device 220 corresponding to the private key of the user device 220. In some embodiments, the user device 220 may store a provisioning server certificate ("PS Cert.") 264 of the provisioning server 260. The provisioning server certificate 264 may include a provisioning server public key that may be used by the user device 220 to generate a shared secret for encrypting communications. However, in some embodiments, the user device 220 may not store the provisioning server certificate 264 and may need to receive it from the provisioning server 260.

The user device 220 may generate a user device ephemeral key pair ("UD Eph. Pub. & Priv. Key Pair") 234 including a user device ephemeral public key and a user device ephemeral private key corresponding to the user device ephemeral public key. At 201, the user device 220 sends the user device ephemeral public key to the provisioning server 260. The user device ephemeral public key may not be used to identify the user device 220 because the user device 220 may only use the user device ephemeral public key for a single communication (e.g., to receive the provisioning server certificate 264). The user device 220 may not store the user device ephemeral key pair after it has performed the communication.

The provisioning server 260 may store (e.g., in a memory circuit) a provisioning server key pair ("PS Pub. & Priv. Key Pair") 262 include a provisioning server private key corresponding to the provisioning server public key. The provisioning server 260 may also store the provisioning server certificate 264. The provisioning server certificate 264 may be signed by the CA using the CA private key. The provisioning server 260 may modify the provisioning server public key such that it may not be used to identify the provisioning server 260. For example, the provisioning server 260 may generate a provisioning server blinding factor (e.g., a cryptographic nonce), and use the provisioning server public key and the provisioning server blinding factor to generate a blinded provisioning server public key. For example, the provisioning server 260 may generate the blinded provisioning server public key by performing a multiplication operation on the provisioning server public key and the provisioning server blinding factor.

The provisioning server 260 may generate a first shared secret using the user device ephemeral public key, the provisioning server private key, and the provisioning server blinding factor. The provisioning server 260 may use the first shared secret to generate a first session key for communicating with the user device 220. The provisioning server 260 may encrypt the provisioning server certificate 264 using the first session key to obtain an encrypted provisioning server certificate. In some embodiments, the provisioning server 260 may also encrypt the provisioning server blinding factor using the first session key to obtain an encrypted provisioning server blinding factor. At 202, the provisioning server 260 sends (e.g., over a network) the blinded provisioning server public key and the encrypted provisioning server certificate to the user device 220. The provisioning server 260 may also send one or more of an encrypted authentication cryptogram, encrypted meta-data, and the encrypted provisioning server blinding factor to the user device 220.

The user device 220 may receive the blinded provisioning server public key and the encrypted provisioning server certificate from the provisioning server 260. The user device 220 may generate the same first shared secret generated by the provisioning server 260, using the blinded provisioning server public key and the user device ephemeral private key. The user device 220 may generate the first session key using the first shared secret. The user device 220 may use the first session key to decrypt the encrypted provisioning server certificate to obtain the provisioning server certificate. In some embodiments, the user device 220 may also receive and decrypt the encrypted provisioning server blinding factor. The user device 220 may verify the provisioning server certificate 264 using the CA public key of the CA certificate 232. In some embodiments, the user device 220 may verify the blinded provisioning server public key using the provisioning server blinding factor and the provisioning server public key of the provisioning server certificate 264. In some embodiments, the user device 220 may also receive and decrypt the encrypted authentication cryptogram and may also validate the authentication cryptogram. The user device 220 may store the provisioning server certificate 264 (e.g., in a memory circuit).

Thus, the user device 220 may confidentially obtain the provisioning server certificate 264 if it did not already have it stored. In some embodiments, where user device 220 already stores the provisioning server certificate 264, the messaging at 201 and 202 may be skipped.

At 203, user device 220 may encrypt identification data to obtain encrypted identification data. The user device 220 may send the encrypted identification data to provisioning server 260 (e.g., over a network). In some embodiments, such as those where messaging 201 and 202 were previously performed, the user device 220 may use the previously established shared secret to perform the encryption and decryption described with reference to messaging 203 and 204. In other embodiments, such as those where messaging 201 and 202 were not performed, the encryption and decryption described above with reference to the messaging 203 may be performed using a second shared secret generated based on the stored provisioning server certificate 264. The provisioning server 260 may encrypt the provisioning data using the shared secret established for the messaging at 202 or using the second shared secret. At 204, the provisioning server 260 sends the encrypted provisioning data to the user device 220. In some embodiments, provisioning server 260 may also send a blinded provisioning server public key, an authentication cryptogram, meta-data, and/or a new encrypted server certificate (e.g., new server credentials to be used in future communication with provisioning server 260) to the user device 220.

Thus, the message flow of FIG. 2 enables the user device 220 to obtain provisioning data from the provisioning server 260 while maintaining confidentiality of its identity.

III. Provisioning with Authentication

In some embodiments, an authentication server (e.g., authentication server 140) may offer authentication capabilities "as a service" (e.g., using an API or other interface accessible by other entities) to a provisioning server (e.g., provisioning server 260). For example, a provisioning server may interface with authentication server in order to authenticate a user device (e.g., user device 120 or user device 220) prior to provisioning data to the user device. The provisioning server may only perform a provisioning process in response to the user being authenticated. In some embodiments, both the authentication server and the provisioning server may be implemented on the same set of computing devices, or may be operated by the same entity.

Figure 3:
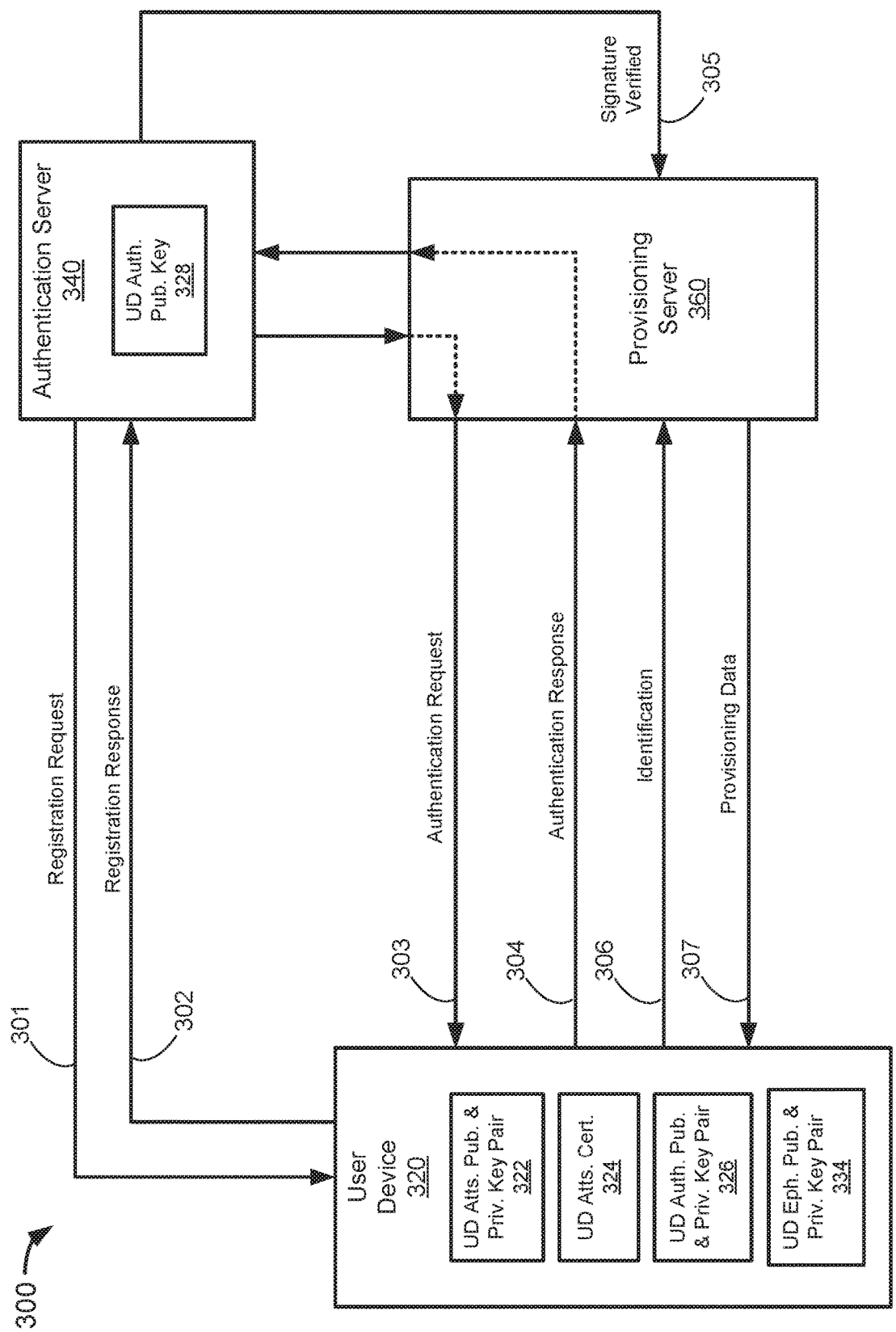
FIG. 3 shows a message flow diagram for authenticating a user device and provisioning data to the user device, in accordance with some embodiments.

FIG. 3 shows a message flow diagram 300 for authenticating a user device 320 and provisioning data to the user device 320, in accordance with some embodiments. The user device 320 of FIG. 3 may operate similar to the user devices 110, 220 described above. The authentication server 340 of FIG. 3 may operate similar to the authentication server 140 described above. The provisioning server 360 of FIG. 3 may operate similar to the provisioning server 260 described above. Although FIG. 3 shows the messaging as being performed by the user device 320, the authentication server 340, and the provisioning server 360, some or all of the messaging steps may be performed by another suitable entity. For example, the authentication server 340 and the provisioning server 360 may perform certain operations instead of the other or the authentication server 340 and the provisioning server 360 may be combined. In addition, the messaging shown in FIG. 3 may be performed in a different order or in another suitable manner.

Prior to the message flow 300, the user device 320 may store (e.g., in a memory circuit) a user device attestation key pair ("UD Atts. Pub. & Priv. Key Pair") 322 including a user device attestation public key and a user device attestation private key corresponding to the user device attestation public key. The user device 320 may also store a user device attestation certificate ("UD Atts. Cert.") 324 comprising the user device attestation public key. The user device attestation certificate may be signed by a CA using a private key of the CA. Prior to the messaging flow 300, the authentication server 340 may store (e.g., in a memory circuit) a CA certificate including a CA public key corresponding to the CA private key. The CA public key may be used to verify data signed by the CA private key.

The user device 320 may register and authenticate with the authentication server 340 in a process similar to the registration and authentication process described above with reference to FIG. 1. At 301, the authentication server 340 may send a registration request to the user device 320. The registration request at 301 of FIG. 3 may be structured similar to the registration response at 101 of FIG. 1 described above. In response to receiving the registration request, the user device may authenticate a user of the user device 320 and generate a user device authentication key pair ("UD Auth. Pub. & Priv. Key Pair") 326. The user device authentication key pair 326 may include a user device authentication public key 328 and a user device authentication private key corresponding to the user device authentication public key 328. The user device 320 may store (e.g., in a memory circuit) the user device authentication key pair 326.

At 302, the user device 320 may send a registration response to the authentication server 340. The registration response at 302 of FIG. 3 may be structured similar to the registration response at 103 of FIG. 1 described above. For example, the registration response may include an application ID, the user device attestation certificate 324, and the user device authentication public key 328 signed by the user device attestation private key.

The authentication server 340 may verify the user device attestation certificate 324 using the CA public key of the CA certificate. The authentication server 340 may also verify the user device authentication public key 328 using the user device attestation public key of the user device attestation certificate 324.

In some embodiments, prior to 303, the user device 320 may communicate with either the authentication serer 340 or the provisioning server 360. For example, the user device 320 may send a message to initiate an authentication process. In response to the user device 320 initiating the authentication process, the provisioning server 360 may request an authentication request from the authentication server 340. The provisioning server 360 may receive the authentication request from the authentication server 340.

At 303, the provisioning server 360 may send the authentication request to the user device 320. The authentication request at 303 of FIG. 3 may be structured similar to the authentication request at 104 of FIG. 1 described above. For instance, the authentication request may include an authentication challenge.

The user device 320 may process the authentication request. Processing the authentication request may include adding additional data to the received authentication challenge, authenticating or verifying a user of user device 320, and signing the challenge using the user device authentication private key stored at the user device 320 as described above with reference to FIG. 1. At 304, the user device 320 sends an authentication response including the signed challenge data, and possibly other data, to the provisioning server 360.

The provisioning server 360 may send the authentication response from the user device 320 to the authentication server 340. The authentication server 340 may verify the signed authentication challenge using the user device authentication public key 328 stored at the authentication server 340. In some embodiments, the authentication server 340 may also verify that the signed authentication challenge matches the authentication challenge of the authentication request. Thus, the user device 320 may register with the authentication server 340 and be authenticated by the authentication server 340.

At 305, the authentication server 340 may send an indication that the signed authentication challenge has been verified to the provisioning server 360. The provisioning server 360 may provide provisioning data to the user device 320 based on whether the signed authentication challenge is verified. For instance, if the provisioning server 360 does not receive an indication from the authentication server 340 that the signature of the signed authentication challenge is valid, then the provisioning server 360 may not provide provisioning data to the user device 320.

If the provisioning server 360 receives, from the authentication server 340, an indication that the signature of the signed authentication challenge is valid, then the provisioning server 360 and the user device 320 may perform a provisioning process similar to the provisioning process described above with reference to FIG. 2. For instance, at 306, the user device 320 may send the identification data to provisioning server 360. In response to receiving the identification information, at 307, the provisioning server 360 may send provisioning data to the user device 307. The messaging at 306 and 307 for provisioning may be encrypted using a user device ephemeral key pair ("UD Eph. Pub. & Priv. Key Pair") 334 similar to the encryption process described above with reference to FIG. 2. As such, the provisioning server 360 may provision data to the user device 320 based on authentication of the user device 320 with the authentication server 340.

IV. Confidential Authentication and Provisioning

The authentication and provisioning process described above with respect to FIG. 3 enables a provisioning server to provision data to a user device based on authentication of that user device with the authentication server. While the provisioning process described above may provide confidentiality to the user device through the use of an ephemeral key pairs and blinded public keys, the authentication process does not provide such confidentiality. In authentication, the user device may still be tracked based on the transmission of its signature (e.g., in signed data) or its public key. The systems and methods described below address this issue.

A. Authentication Using a Stored Provisioning Server Certificate

Figure 4:
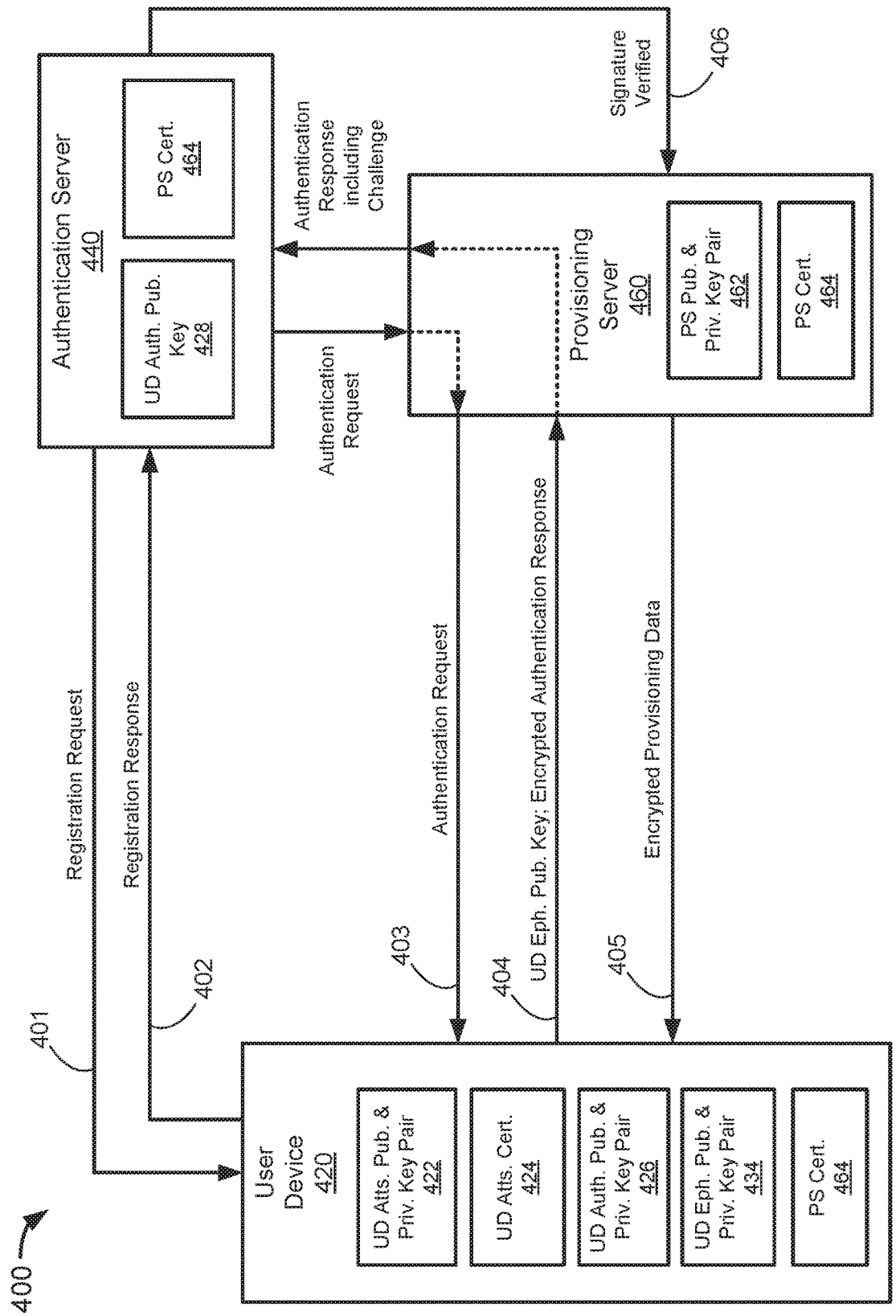
FIG. 4 shows a message flow diagram including an authentication response and provisioning data that are confidential and secure, in accordance with some embodiments.

FIG. 4 shows a message flow diagram 400 including an authentication response and provisioning data that are confidential and secure, in accordance with some embodiments. The message flow 400 shows messaging between the user device 420 that is pre-loaded with a provisioning server certificate, an authentication server 440, and a provisioning server 460. The user device 420 of FIG. 4 may operate similar to the user device 320 described above. The authentication server 440 of FIG. 4 may operate similar to the authentication server 340 described above. The provisioning server 460 of FIG. 4 may operate similar to the provisioning server 360 described above. The messaging of FIG. 4 may be performed in a different order or in another suitable manner. The authentication server 440 and the provisioning server 460 may perform certain operations instead of the other or the authentication server 440 and the provisioning server 460 may be combined Prior to the message flow 400, the user device 420 may store (e.g., in a memory circuit) a user device attestation key pair ("UD Atts. Pub. & Priv. Key Pair") 422 including a user device attestation public key and a user device attestation private key. The user device 420 may also store a user device attestation certificate 424 comprising the user device attestation public key. In addition, the user device 420 may store a provisioning server certificate ("PS Cert.") 464 that includes a provisioning server public key and is signed by a certificate authority ("CA") using a private key of the CA. The user device 420 may also pre-generate and store a user device ephemeral key pair ("UD Eph. Pub. & Priv. Key Pair") 434 including a user device ephemeral public key and a user device ephemeral private key corresponding to the user device ephemeral public key.

Prior to message flow 400, the provisioning server 460 may store (e.g., in a memory circuit) a provisioning server key pair ("PS Pub. & Priv. Key Pair") 462 including a provisioning server public key and a provisioning server private key corresponding to the provisioning server public key. The provisioning server 460 may also store the provisioning server certificate 464. The provisioning server certificate 464 may include the provisioning server public key and it may be signed by the CA using a CA private key.

The user device 420 may register with the authentication server 440 in a process similar to the registration process described above with reference to FIG. 3. At 401, the authentication server 440 may send a registration request to the user device 420. The registration request at 401 of FIG. 4 may be structured similar to the registration responses described above. In response to receiving the registration request, the user device 420 may authenticate a user of the user device 420 and generate a user device authentication key pair ("UD Auth. Pub. & Priv. Key Pair") 426. The user device authentication key pair 426 may include a user device authentication public key 428 and a user device authentication private key corresponding to the user device authentication public key 428. The user device 420 may store (e.g., in a memory circuit) the user device authentication key pair 426.

At 402, the user device 420 may send a registration response to the authentication server 440. The registration response at 402 of FIG. 4 may be structured similar to the registration responses described above. For example, the registration response may include the user device attestation certificate 424 and the user device authentication public key 428 signed by the user device attestation private key.

The authentication server 440 may store a CA certificate and may verify the user device attestation certificate 424 using the CA public key of the CA certificate. The authentication server 440 may also verify the user device authentication public key 428 using the user device attestation public key of the user device attestation certificate 424. In some embodiments, the authentication server 440 may store the provisioning server certificate 464 and the authentication server 440 may send the provisioning server certificate 464 to the user device 420 in response to verifying the user device authentication public key 428. In other embodiments, the user device 420 may obtain the provisioning server certificate 464 prior to registration.

After registration, the user device 420 may initiate authentication. For example, the user device 420 may send a message to the provisioning server 460 to initiate an authentication process. In response to the user device 420 initiating the authentication process, the provisioning server 460 may request an authentication request from the authentication server 440. The provisioning server 460 may receive the authentication request from the authentication server 440.

At 403, the provisioning server 460 may send the authentication request to the user device 420. The authentication request at 403 of FIG. 3 may be structured similar to the authentication requests described above. For instance, the authentication request may include an authentication challenge.

The user device 420 may processes the authentication request. Processing the authentication request may include adding additional data to the received authentication challenge, authenticating or verifying a user of user device 320, and signing the challenge using the user device authentication private key stored at the user device 420.

In contrast to the authentication processes described above with respect to FIGS. 1 and 3, in this embodiment, the user device 420 may confidentially transmit an encrypted authentication response. The user device 420 may generate the user device ephemeral key pair 434 if it was not pre-generated. The user device 420 may generate a shared secret using the user device ephemeral private key and the provisioning server public key of the stored provisioning server certificate 464. The user device may generate a session key based on the shared secret and encrypt the authentication response using the session key to obtain an encrypted authentication response.

At 404, the user device 420 may send the user device ephemeral public key and the encrypted authentication response including the signed challenge data to the provisioning server 460. As such, the authentication response at 403 maintains confidentiality because the user device ephemeral key pair 434 may not be used to identify or track the user device 420 since it may only be used to encrypt a limited number of messages (e.g., the authentication response only or the authentication response and the provisioning data). In addition, the authentication response is secured because it is encrypted using the shared secret.

The provisioning server 460 may receive the user device ephemeral public key and the encrypted authentication response from the user device 420. The provisioning server 460 may generate the same shared secret generated by the user device 420 using the provisioning server private key and the user device ephemeral public key. The provisioning server 460 may generate the session key using the shared secret and use the session key to decrypt the encrypted authentication response to obtain the authentication response. The provisioning server 460 may send the authentication response to the authentication server 440.

The authentication server 440 may verify the signed authentication challenge of the authentication response using the stored user device authentication public key 428. For example, the signed challenge data may be decrypted using the user device authentication public key 428 to obtain a decrypted challenge, which may be compared to the authentication challenge included in the authentication request. The signed authentication challenge may be verified based on whether the decrypted challenge matches an expected value. At 406, the authentication server 440 may send an indication that the signed authentication challenge has been verified to the provisioning server 460.

The provisioning server 460 may provide provisioning data the user device 420 based on whether the signed authentication challenge is verified. For instance, if the provisioning server 460 does not receive an indication from the authentication server 440 that the signature of the signed authentication challenge is valid, then the provisioning server 460 may not provide provisioning data to the user device 420. The provisioning server 460 may encrypt the provisioning data. In some embodiments, the provisioning server 460 may encrypt the provisioning data using the shared secret. In other embodiments, the provisioning server 460 may generate a second shared secret for encrypting the provisioning data. For example, the provisioning server 460 may blind the provisioning server key pair 462 using a provisioning server blinding factor (e.g., a cryptographic nonce) to obtain a blinded provisioning server public key and a blinded provisioning server private key. The provisioning server 460 may then derive the second shared secret using the blinded provisioning server private key and the user device ephemeral public key. The provisioning server 460 may encrypt the provisioning data using the second shared secret to obtain encrypted provisioning data. At 405, the provisioning server 460 may send the blinded provisioning server public key and the encrypted provisioning data to the user device 420.

The user device 420 may decrypt the encrypted provisioning data to obtain provisioning data and the user device 430 may store the provisioning data (e.g., in a memory circuit). For example, in embodiments where the user device 420 receives the encrypted payment credential and the blinded provisioning server public key, the user device 420 may generate the second shared secret using the user device ephemeral private key and the blinded provisioning server public key. The user device 420 may use the second shared secret to decrypt the encrypted provisioning data.

As such, the user device 420 may send an authentication response that is confidential and secure since the authentication response is encrypted and the public key sent to the provisioning server 460 for decryption is an ephemeral key. The provisioning data is also secure since it is encrypted as described above.

B. Authentication Including Transfer of a Provisioning Server Certificate

The authentication process as described above with respect to FIG. 4 uses a provisioning server certificate that is stored on the user device prior to authentication. However, in some cases, the user device may not store the provisioning server certificate prior to the authentication process. In such cases, the provisioning server certificate may need to be transferred to the user device as part of the provisioning process, rather than being assumed to have been previously loaded onto user device.

Figure 5:
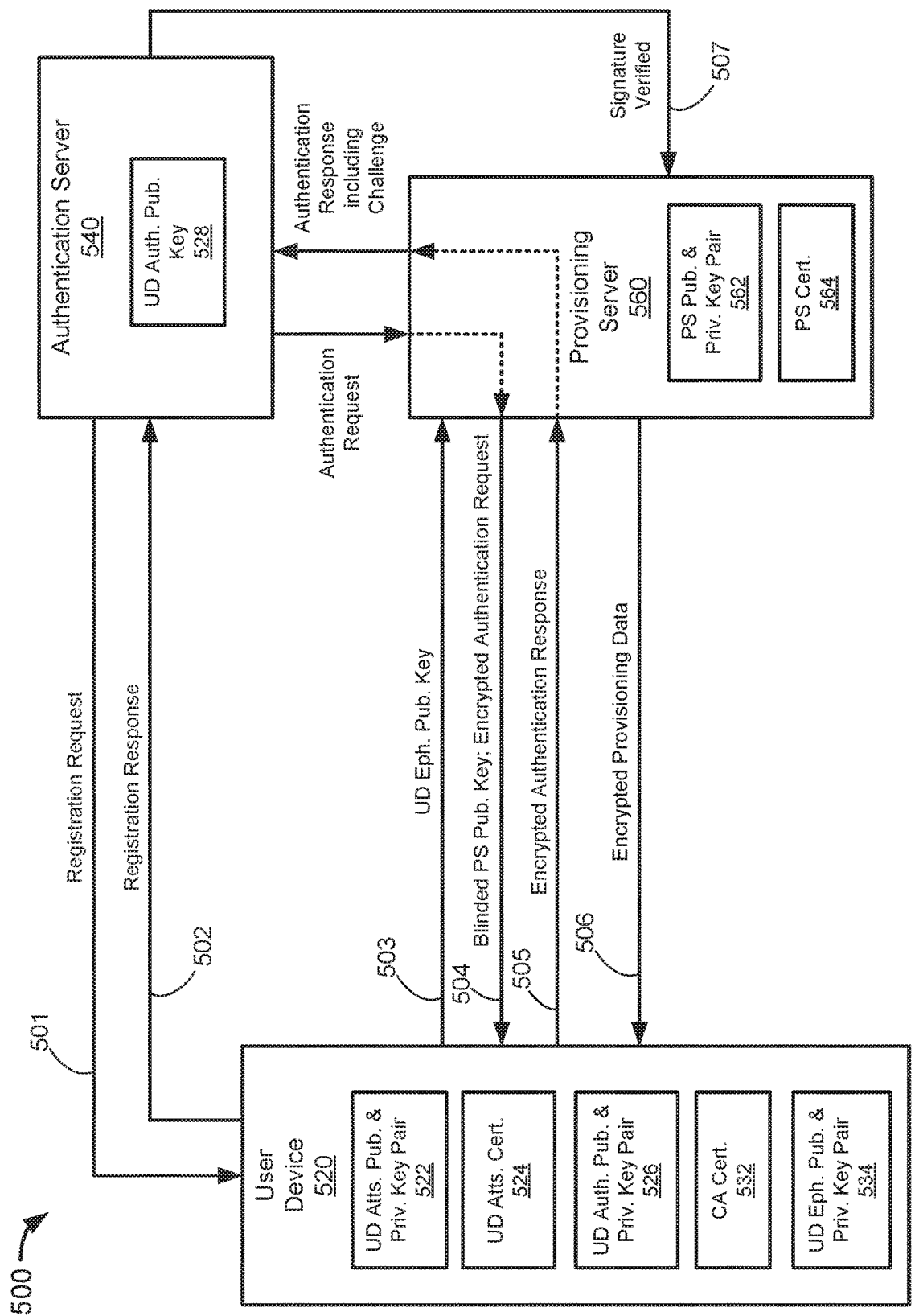
FIG. 5 shows a message flow including authentication of a user device that may not store a provisioning server certificate, in accordance with some embodiments.

FIG. 5 shows a message flow 500 including authentication of a user device 520 that may not store a provisioning server certificate 564, in accordance with some embodiments. Compared to the message flow 400 of FIG. 4, the message flow 500 of FIG. 5 includes an encrypted authentication response. The message flow 500 shows messaging between the user device 520, an authentication server 540, and a provisioning server 560. The user device 520 of FIG. 5 may operate similar to the user devices described above. The authentication server 540 of FIG. 5 may operate similar to the authentication servers described above. The provisioning server 560 of FIG. 5 may operate similar to the provisioning servers described above. The messaging of FIG. 5 may be performed in a different order or in another suitable manner. The authentication server 540 and the provisioning server 560 may perform certain operations instead of the other or the authentication server 540 and the provisioning server 560 may be combined.

Prior to message flow 500, the user device 520 may store (e.g., in a memory circuit) a user device attestation key pair ("UD Atts. Pub. & Priv. Key Pair") 522 including a user device attestation public key and a user device attestation private key. The user device 520 may also store a user device attestation certificate 524 comprising the user device attestation public key. In addition, the user device 520 may store a CA certificate ("CA Cert.") 532 that includes a CA public key. The user device 520 may also pre-generate and store a user device ephemeral key pair ("UD Eph. Pub. & Priv. Key Pair") 534 including a user device ephemeral public key and a user device ephemeral private key corresponding to the user device ephemeral public key.

Prior to message flow 500, the provisioning server 560 may store (e.g., in a memory circuit) a provisioning server key pair ("PS Pub. & Priv. Key Pair") 562 including a provisioning server public key and a provisioning server private key corresponding to the provisioning server public key. The provisioning server 560 may also store the provisioning server certificate 564. The provisioning server certificate 564 may include the provisioning server public key and it may be signed by the CA using a CA private key.

The user device 520 may register with the authentication server 540 in a process similar to the registration process described above with reference to FIG. 4. At 501, the authentication server 540 may send a registration request to the user device 520. The registration request at 501 of FIG. 5 may be structured similar to the registration responses described above. In response to receiving the registration request, the user device 520 may authenticate a user of the user device 520 and generate a user device authentication key pair ("UD Auth. Pub. & Priv. Key Pair") 526. The user device authentication key pair 526 may include a user device authentication public key 528 and a user device authentication private key corresponding to the user device authentication public key 528. The user device 520 may store (e.g., in a memory circuit) the user device authentication key pair 526.

At 502, the user device 520 may send a registration response to the authentication server 540. The registration response at 502 of FIG. 5 may be structured similar to the registration responses described above. For example, the registration response may include the user device attestation certificate 524 and the user device authentication public key 528 signed by the user device attestation private key.

The authentication server 540 may store a CA certificate and may verify the user device attestation certificate 524 using the CA public key of the CA certificate. The authentication server 540 may also verify the user device authentication public key 528 using the user device attestation public key of the user device attestation certificate 524.

After registration, the user device 520 may initiate authentication. For instance, at 503, the user device 520 may send the user device ephemeral public key to provisioning server 560. The user device 520 may generate the user device ephemeral key pair 534 if it was not pre-generated.

The provisioning server 560 may request and receive an authentication request including an authentication challenge from the authentication server 540. The provisioning server 560 may generate a provisioning server blinding factor (e.g., a cryptographic nonce) and use the provisioning server blinding factor to generate a blinded provisioning server public key and a blinded provisioning server private key based on the provisioning server key pair ("PS Pub. & Priv. Key Pair") 564. The provisioning server 560 may generate a shared secret using the user device ephemeral public key and the blinded provisioning server private key. The provisioning server 560 may encrypt the authentication request using the shared secret to obtain an encrypted authentication request. At 504, the provisioning server 560 may send the blinded provisioning server public key and the encrypted authentication request to the user device 520. The provisioning server may also encrypt and send, to the user device 520, the provisioning server certificate 564, the provisioning server blinding factor, an authentication cryptogram, metadata, and the encrypted data.

The user device 520 may receive the blinded provisioning server public key and the encrypted authentication request from the provisioning server. The user device 520 may generate the shared secret using the blinded provisioning server public key and the user device ephemeral private key. The user device 520 may decrypt the encrypted authentication request using the shared secret to obtain the authentication request. In some embodiments, the user device 520 may also receive and decrypt, using the shared secret, the provisioning server certificate 564, an authentication cryptogram, and the provisioning server blinding factor. The user device 520 may verify the provisioning server certificate 564 using the CA certificate 532. The user device 520 may verify the blinded provisioning server public key using the provisioning server certificate and a provisioning server public key obtained from the provisioning server certificate 564. The user device 520 may also validate the authentication cryptogram.

As such, the authentication request at 504 maintains confidentiality because the blinded provisioning server public key may not be used to identify or track the provisioning server 560 since the provisioning server blinding factor was applied to the provisioning server public key. In addition, the authentication request is secured because it is encrypted using the shared secret.

The user device 520 may receive the blinded provisioning server certificate and the encrypted authentication request. The user device 520 may generate the shared secret using the blinded provisioning server public key and the user device ephemeral private key corresponding to the user device ephemeral public key. The user device 520 may use the shared secret to decrypt the encrypted authentication request to obtain the authentication request. The user device 520 may processes the authentication request. Processing the authentication request may include adding additional data to the authentication challenge included in the authentication request, verifying a user of the user device 520, and signing the authentication challenge using the user device authentication private key stored by the user device 520.

The user device 520 may generate an authentication response including the signed authentication challenge. At 505, the user device 520 sends an encrypted authentication response to provisioning server 560. In some embodiments, the user device 520 may use the shared secret to encrypt the authentication response. In other embodiments, the user device 520 may generate a second shared secret for encrypting the authentication response using a second user device key pair (e.g., another ephemeral key pair). In such embodiments, the user device 520 may send the second user device ephemeral public key to the provisioning server 560.

The provisioning server 560 may receive the encrypted authentication response. The provisioning server 560 may decrypt the encrypted authentication response using the shared secret to obtain the authentication response. In some embodiments, where the user device 520 sends the second user device ephemeral public key, the provisioning server may generate the second shared secret using the provisioning server private key and the second user device ephemeral public key. The provisioning server 560 may send the authentication response to the authentication server 540.

The authentication server 540 may verify the signed authentication challenge of the authentication response using the stored user device authentication public key 528. For example, the authentication server 540 may decrypt the signed authentication challenge and it may be compared to the authentication challenge of the authentication request. The signed authentication challenge may be verified based on whether the decrypted challenge matches an expected value. At 507, the authentication server 540 may send an indication that the signed authentication challenge has been verified to the provisioning server 460.

The provisioning server 560 may provide provisioning data the user device 520 based on whether the signed authentication challenge is verified. For instance, if the provisioning server 560 does not receive an indication from the authentication server 540 that the signature of the signed authentication challenge is valid, then the provisioning server 560 may not provide provisioning data to the user device 520. The provisioning server 560 may encrypt the provisioning data. In some embodiments, the provisioning server 560 may encrypt the provisioning data using the shared secret to obtain encrypted provisioning data. In other embodiments, the provisioning server 560 may encrypt the provisioning data using the second shared secret. At 506, the provisioning server 560 may send the encrypted provisioning data to the user device 520.

As such, the authentication request at 504 maintains confidentiality because the blinded provisioning server public key may not be used to identify or track the provisioning server 560 since the provisioning server blinding factor was applied to the provisioning server public key. In addition, the authentication request, the authentication response, and the provisioning data are secured because they encrypted.

V. Improved Confidential Registration, Authentication, and Provisioning

Certain registration and authentication processes may be vulnerable to man-in-the-middle attacks. For example, a malicious device may masquerade as a legitimate user device while performing the registration or authentication. This may allow the malicious device to obtain in clear-text an authentication request sent by a provisioning server. Although the malicious device may not be able to sign an authentication challenge using the legitimate user device's private key, it may be possible (e.g., using malware installed on the legitimate user device), to obtain the user device's signature of the authentication challenge. The malicious device may then use the signed authentication challenge to respond to the provisioning server. In this manner, the malicious device may be able to obtain provisioning data for which it is unauthorized.

Some embodiments address this issue by encrypting communication between a user device and a provisioning server using a user device authentication key that is registered with an authentication server. This precludes entities that do not have the user device authentication private key of the user device from receiving a clear-text authentication request or authentication challenge, thereby preventing the man-in-the-middle attack described above.

Figure 6:
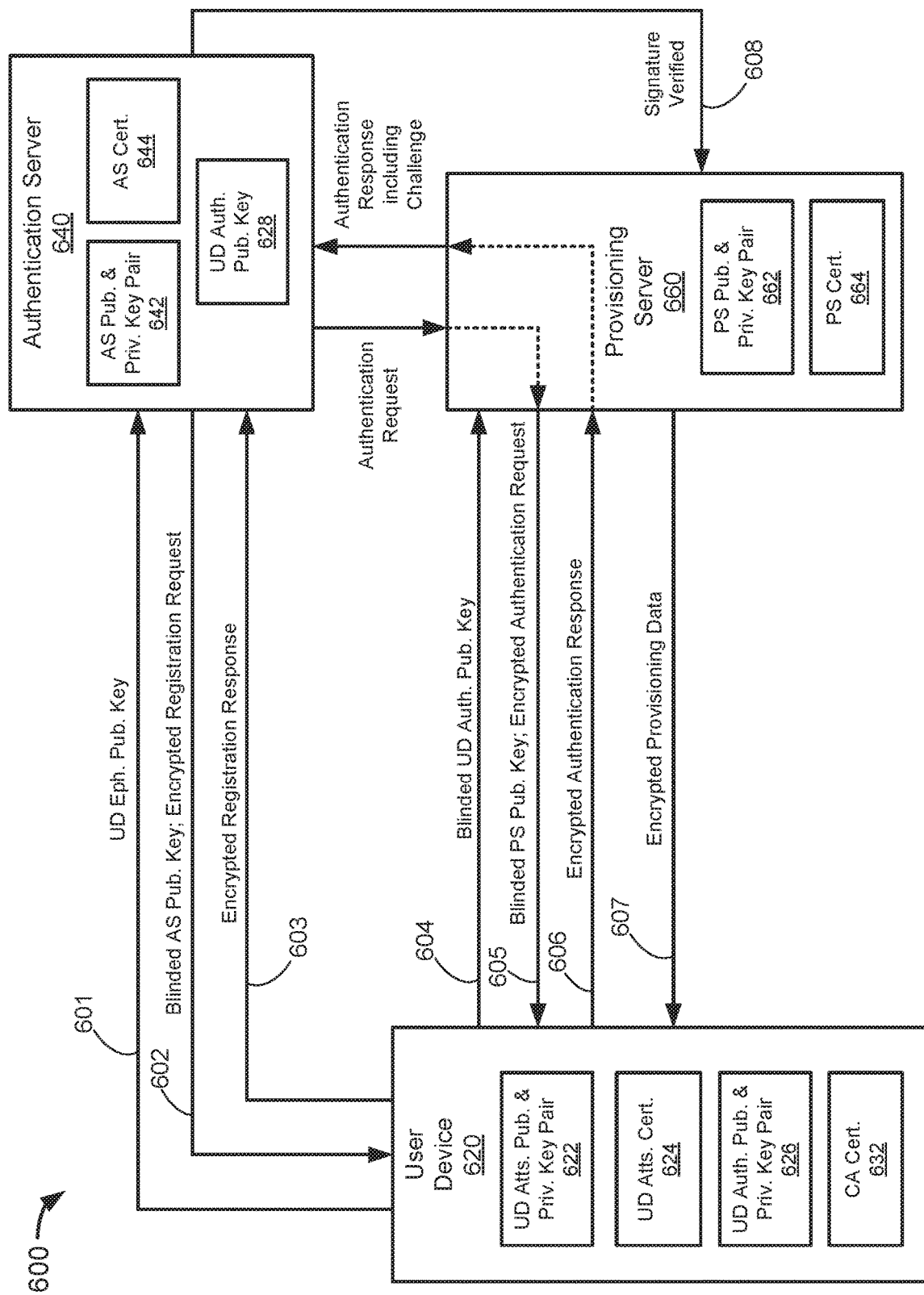
FIG. 6 shows a message flow diagram for securely provisioning data to a user device using a registered user device authentication public key, in accordance with some embodiments.

FIG. 6 shows a message flow diagram 600 for securely provisioning data to a user device using a registered user device authentication public key, in accordance with some embodiments. The message flow 600 shows messaging between the user device 620, an authentication server 640, and a provisioning server 660. The user device 620 of FIG. 6 may operate similar to the user devices described above. The authentication server 640 of FIG. 6 may operate similar to the authentication servers described above. The provisioning server 660 of FIG. 6 may operate similar to the provisioning servers described above. The messaging of FIG. 6 may be performed in a different order or in another suitable manner. In addition, although FIG. 6 shows the messaging as being performed by the user device 620, the authentication server 640, and the provisioning server 660, it should be noted some or all steps may be performed by another suitable entity. The authentication server 640 and the provisioning server 660 may perform certain operations instead of the other or the authentication server 640 and the provisioning server 660 may be combined.

Prior to message flow 600, the user device 620 may store a user device attestation key pair ("UD Atts. Pub & Priv. Key Pair") 622 including a user device attestation public key and a user device attestation private key corresponding to the user device attestation public key. The user device 620 may also store a user device attestation certificate comprising the user device attestation public key. The user device 620 may also store a certificate authority certificate ("CA Cert.") 632 including a CA public key.

Prior to message flow 600, the provisioning server 660 may store a provisioning server key pair ("PS Pub. & Priv. Key Pair") 662 including a provisioning server public key and a provisioning server private key corresponding to the provisioning server public key. The provisioning server 660 may also store a provisioning server certificate ("PS Cert.") that includes the provisioning server public key and is signed by the certificate authority.

Prior to the message flow 600, the authentication server 640 may store an authentication server certificate ("AS Cert.") 646, including an authentication server public key, that is signed by a CA. the authentication server 640 may also store an authentication server key pair ("AS Pub. & Priv. Key Pair) 642 including the authentication server public key and an authentication server private key corresponding to the authentication server public key.

As discussed above, the registration processes registers an authentication public key of a user device with an authentication server. In addition, the registration process of FIG. 6 may establish a shared secret between the user device 620 and the authentication server 640, and registration may be conducted using a session key determined from the shared secret.

The user device 620 may generate a user device ephemeral key pair including a user device ephemeral public key and a user device ephemeral private key corresponding to the user device ephemeral public key. At 601, user device 620 may sends the user device ephemeral public key to authentication server 640.

The authentication server 640 may generate an authentication server blinding factor (e.g., a cryptographic nonce) and combine the blinding factor with the authentication server key pair to generate a blinded authentication server public key and a blinded authentication server private key. Authentication server 640 may generate a shared secret using the user device ephemeral public key and the blinded authentication server private key. The authentication server 640 may use the shared secret to generate a session key. The authentication server 640 may encrypt the authentication server certificate 644, the authentication server blinding factor, and a registration request using the shared secret to obtain, respectively, an encrypted authentication server certificate, an encrypted authentication server blinding factor, and an encrypted registration response. At 602, the authentication server 640 may send the blinded authentication server public key and the encrypted registration request to the user device 620. The authentication server 640 may also send an encrypted authentication cryptogram, encrypted meta-data, the encrypted authentication server certificate, and the encrypted authentication server blinding to user device 620.

The user device 620 may generate the same shared secret as generated by authentication server 640 using the blinded authentication server public key and the user device ephemeral private key. The user device 620 may generate a session key using the shared secret. The user device 620 may use the shared secret to decrypt the encrypted registration request to obtain the registration request. The user device 620 may also use the shared secret to decrypt the encrypted authentication server certificate 644 and the encrypted authentication server blinding factor. The user device 620 may verify the authentication server certificate 644 using the CA certificate 632. The user device 620 may verify the blinded authentication server public key using the authentication server blinding factor an authentication server public key obtained from the authentication server certificate 644. The user device 620 may also validate the authentication cryptogram.

The user device 620 may require authentication of a user of the user device 720 based on the registration request. To authenticate, the user may input authentication information into the user device 720. For example, the user may input authentication information including at least one of a user identifier, a password, passcode, a PIN, a fingerprint scan, a retinal scan, or other biometric data. In response to authenticating the user, the user device 620 may generate a user device authentication key pair (UD Auth. Pub. & Priv. Key Pair") 626 including a user device authentication public key 628 and a user device authentication private key corresponding to the user device authentication public key. The user device 720 may associate the input authentication information with the user device authentication key pair. The user device 620 may sign the user device authentication public key 628 using the user device attestation private key to obtain a signed user device authentication public key. The user device 620 may generate a registration response including the signed user device authentication public key and the user device attestation certificate. The user device 620 may encrypt the registration response using the shared secret.

At 603, the user device 620 may send the encrypted registration response to authentication server 640. In some embodiments, the authentication response can be encrypted using the shared secret. In other embodiments, the user device 620 may generate a second registration shared secret for encrypting the registration response.

The authentication server 640 may decrypt the encrypted registration response using the shared secret to obtain the registration response. The authentication server 640 may verify the user device attestation certificate 624 using a CA public key. The authentication server 640 may also verify the user device authentication public key 628 using the user device attestation public key of the user device attestation certificate 624.

As such, the user device 620 may confidentially register with the authentication server 640 using the user device ephemeral public key since it may not be used to identify or track the user device 620. In addition, the registration request and the registration response are secured because they are encrypted using the shared secret.

In an authentication process, the user device 620 may generate a user device blinding factor, which may be a cryptographic nonce. The user device 620 may blinds the user device authentication key pair 626 using the user device blinding factor to determine a blinded user device authentication public key and a blinded user device authentication private key. At 604, the user device 620 may send the blinded user device authentication public key to the provisioning server 660.

The provisioning server 660 may generate a provisioning server blinding factor, such as a cryptographic nonce. The provisioning server 660 may blind the provisioning server key pair 662 using the provisioning server blinding factor to obtain a blinded provisioning server public key and a blinded provisioning server private key. The provisioning server 660 may generate an authentication shared secret using the blinded user device authentication public key and the blinded provisioning server private key. The provisioning server 660 may obtains an authentication request for the user device 620 from the authentication server 640. The authentication request may include an authentication challenge. The provisioning server 660 may encrypt the provisioning server certificate 664, the provisioning server blinding factor, and the authentication request using the authentication shared secret to obtain, respectively, an encrypted provisioning server certificate, an encrypted provisioning server blinding factor, and an encrypted authentication request. At 605, the provisioning server 660 may send the blinded provisioning server public key and the encrypted authentication request to the user device 620. The provisioning server 660 may also send the encrypted provisioning server certificate and the encrypted provisioning server blinding factor to the user device 620.

The user device 620 may generate the authentication shared secret using the blinded provisioning server public key and the blinded user device authentication private key. The user device 620 may decrypt the encrypted authentication request, the encrypted provisioning server certificate, and the encrypted provisioning server blinding factor using the authentication shared secret to obtain, respectively, the authentication request, the provisioning server certificate, and the provisioning server blinding factor. The user device 620 may verify the provisioning server certificate using the CA certificate 632, and may verify the blinded provisioning server public key using the provisioning server blinding factor and a provisioning server public key obtained from the provisioning server certificate 664.

The user device may processes the authentication request. Processing the authentication request may include adding additional data to the received challenge, authenticating a user of user device 620 (e.g., by requiring the authentication information input at registration to be input by the user), and signing the authentication challenge in the authentication request using the user device authentication private key stored at the user device 620. The user device may generate an authentication response including the signed authentication challenge. The user device 620 may encrypt the user device blinding factor and the authentication response using the authentication shared secret to obtain an encrypted user device blinding factor and an encrypted authentication response, respectively. At 606, the user device 620 may send the encrypted authentication response to provisioning server 660. The user device 620 may also send the encrypted user device blinding factor to the provisioning server 660.

The provisioning server 660 may use the authentication shared secret to decrypt the encrypted authentication response and the encrypted user device blinding factor to obtain the authentication response and the user device blinding factor, respectively. The provisioning server may send the authentication response to the authentication server 640. The authentication server 640 may verify the signed challenge using the user device authentication public key 628 stored at the authentication server 640 during registration of the user device 620. For example, the signed challenge may be verified by decrypted, using the user device authentication public key 628, and it may be compared to the authentication challenge of the authentication request. If the signed authentication challenge matches an expected value, then the authentication server may authenticate the user device 620. At 608, the authentication server 640 may send an indication to the provisioning server 660 that the signed challenge has been verified.

The provisioning server 660 may verify the blinded user device authentication public key by re-generating the blinded user device authentication public key using the user device blinding factor and the user device authentication public key 628 stored at the authentication server 640. If the re-generated key matches the blinded user device authentication public key received at 604, then the blinded user device public key is authenticated.

If the signed challenge and the blinded user device authentication public key are authenticated, the provisioning server 660 may encrypt provisioning data for the user device 620 using the authentication shared secret. At 607, the provisioning server 660 may send the encrypted provisioning data to the user device 620.

As such, the user device authentication public key 626 registered with the authentication server 640 during registration may be used to generate a shared secret for encryption during authentication. This provides advantages over generating an ephemeral key pair for encrypting authentication since generating and using a key pair is computationally intense and requires the use of a large amount of computing resources. Thus, encrypting the authentication request and authentication response using the registered user device authentication public key 626 may use less computing resources compared to a process that generates and uses an ephemeral key pair.

Some embodiments of the invention can leverage the registration process described in method to convey additional information to user device. For example, embodiments can allow an authentication server to transfer an authentication server certificate including an authentication server public key to the user device during a registration process. This can allow the authentication process to be encrypted using a shared secret generated based on the authentication server's public key. Using such a shared secret reduces the amount of computation resources used to perform encryption of communications compared to encrypting communications using an ephemeral key pair generated specifically for that communication.

Figure 7:
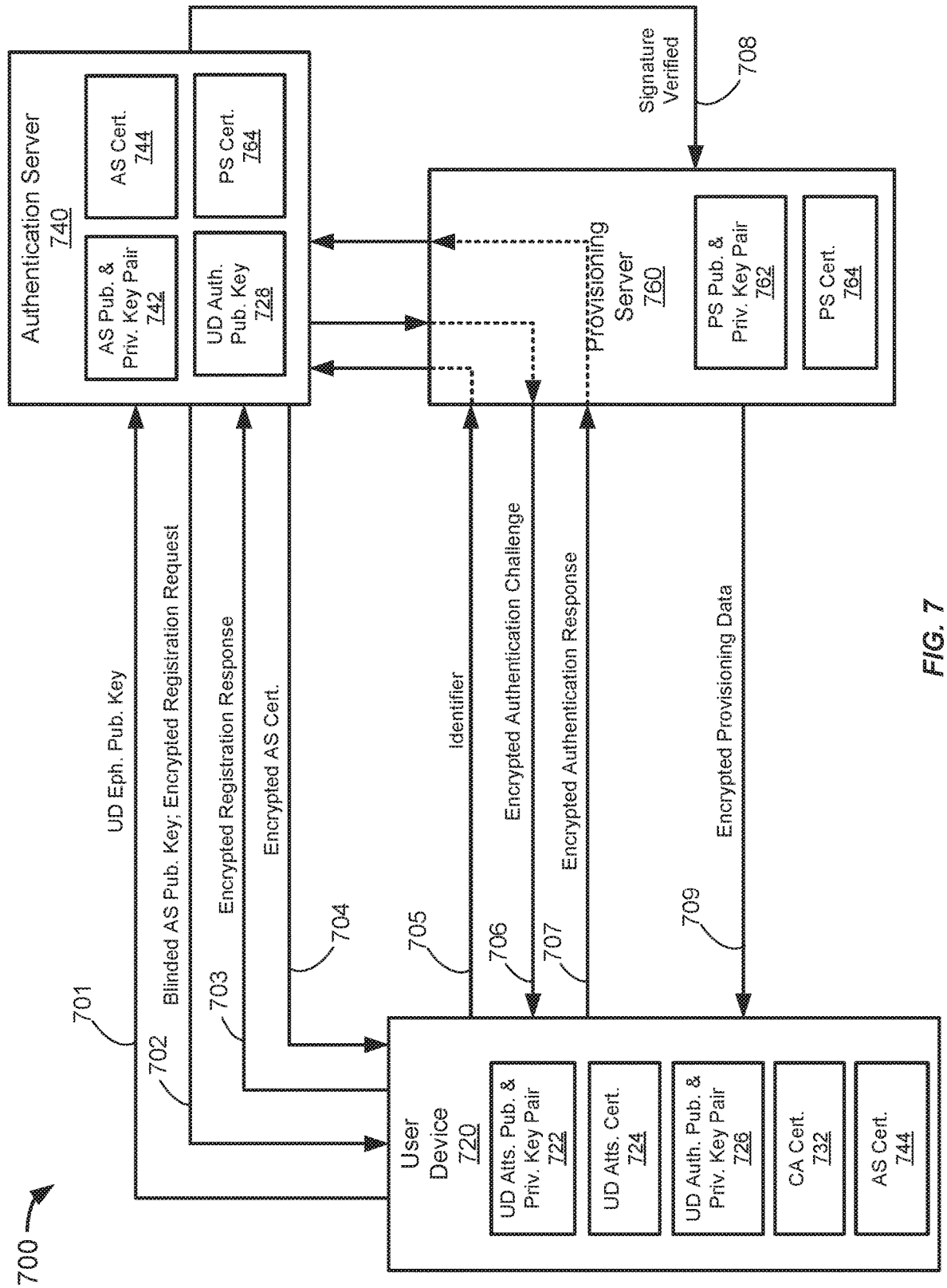
FIG. 7 shows a message flow diagram for secure authentication of a user device using a registered user device authentication public key, in accordance with some embodiments.

FIG. 7 shows a message flow diagram 700 for secure authentication of a user device 720 using a registered user device authentication public key, in accordance with some embodiments. The message flow 700 shows messaging between the user device 720, an authentication server 740, and a provisioning server 760. The user device 720 of FIG. 7 may operate similar to the user devices described above. The authentication server 740 of FIG. 7 may operate similar to the authentication servers described above. The provisioning server 760 of FIG. 7 may operate similar to the provisioning servers described above. The messaging of FIG. 7 may be performed in a different order or in another suitable manner. In addition, although FIG. 7 shows the messaging as being performed by the user device 720, the authentication server 740, and the provisioning server 760, it should be noted some or all steps may be performed by another suitable entity. The authentication server 740 and the provisioning server 760 may perform certain operations instead of the other or the authentication server 740 and the provisioning server 760 may be combined.

Prior to message flow 700, the user device 720 may store a user device attestation key pair ("UD Atts. Pub & Priv. Key Pair") 722 including a user device attestation public key and a user device attestation private key corresponding to the user device attestation public key. The user device 720 may also store a user device attestation certificate ("UD Atts. Cert.") 724 comprising the user device attestation public key. The user device 620 may also store a certificate authority certificate ("CA Cert.") 632 including a CA public key.

Prior to message flow 700, the provisioning server 760 may store a provisioning server key pair ("PS Pub. & Priv. Key Pair") 762 including a provisioning server public key and a provisioning server private key corresponding to the provisioning server public key. The provisioning server 760 may also store a provisioning server certificate ("PS Cert.") 764 that includes the provisioning server public key. The provisioning server certificate 764 may be signed by the certificate authority.

Prior to the message flow 700, the authentication server 740 may store an authentication server certificate ("AS Cert.") 746, including an authentication server public key, that is signed by a CA. the authentication server 640 may also store an authentication server key pair ("AS Pub. & Priv. Key Pair) 642 including the authentication server public key and an authentication server private key corresponding to the authentication server public key. The authentication server 740 may also store the provisioning server certificate 764.

The registration processes of FIG. 7 may register an authentication public key of the user device 720 with the authentication server 740. In addition, the registration process of FIG. 7 may establish a registration shared secret between the user device 720 and the authentication server 740, and registration may be conducted using a registration session key determined from the registration shared secret.

The user device 720 may generate a user device ephemeral key pair including a user device ephemeral public key and a user device ephemeral private key corresponding to the user device ephemeral public key. At 701, user device 720 may send the user device ephemeral public key to authentication server 740.

The authentication server 740 may generate an authentication server blinding factor (e.g., a cryptographic nonce) and combine the blinding factor with the authentication server key pair to generate a blinded authentication server public key and a blinded authentication server private key. The authentication server 740 may generate a registration shared secret using the user device ephemeral public key and the blinded authentication server private key. The authentication server 740 may use the registration shared secret to generate a registration session key. The authentication server 740 may encrypt the authentication server certificate 744, the authentication server blinding factor, and a registration request using the registration shared secret to obtain, respectively, an encrypted authentication server certificate, an encrypted authentication server blinding factor, and an encrypted registration response. At 702, the authentication server 740 may send the blinded authentication server public key, the encrypted authentication server certificate, and the encrypted registration request to the user device 720. The authentication server 740 may also send an encrypted authentication cryptogram, encrypted meta-data, and the encrypted authentication server blinding factor to user device 720.

The user device 720 may generate the same registration shared secret as generated by authentication server 720 using the blinded authentication server public key and the user device ephemeral private key. The user device 720 may generate the registration session key using the registration shared secret. The user device 720 may use the registration shared secret to decrypt the encrypted registration request to obtain the registration request. The user device 720 may also use the registration shared secret to decrypt the encrypted authentication server certificate 744 and the encrypted authentication server blinding factor to obtain the authentication server certificate 744 and the authentication server blinding factor, respectively. The user device 720 may verify the authentication server certificate 744 using the CA certificate 732. The user device 720 may verify the blinded authentication server public key using the authentication server blinding factor an authentication server public key obtained from the authentication server certificate 744.

The user device 720 may require authentication of a user of the user device 720 based on the registration request. To authenticate, the user may input authentication information into the user device 720. For example, the user may input authentication information including at least one of a user identifier, a password, passcode, a PIN, a fingerprint scan, a retinal scan, or other biometric data. In response to authenticating the user, the user device 720 may generate a user device authentication key pair (UD Auth. Pub. & Priv. Key Pair") 726 including a user device authentication public key 728 and a user device authentication private key corresponding to the user device authentication public key. The user device 720 may associate the input authentication information with the user device authentication key pair. The user device 720 may generate a user device authentication key pair ("UD Auth. Pub. & Priv. Key Pair") 726 including a user device authentication public key 728 and a user device authentication private key corresponding to the user device authentication public key. The user device 720 may sign the user device authentication public key 728 using the user device attestation private key to obtain a signed user device authentication public key. The user device 720 may generate a registration response including the signed user device authentication public key, the user device attestation certificate, and an identifier. The identifier associated with the user device authentication public key. The user device 720 may encrypt the registration response using the registration shared secret.

At 703, the user device 720 may send the encrypted registration response to authentication server 740. In some embodiments, the registration response can be encrypted using the registration shared secret. In other embodiments, the user device 720 may generate a second registration shared secret for encrypting the registration response.

The authentication server 740 may decrypt the encrypted registration response using the registrations shared secret to obtain the registration response. The authentication server 740 may verify the user device attestation certificate 724 using a CA public key. The authentication server 740 may also verify the user device authentication public key 728 using the user device attestation public key of the user device attestation certificate 724. The authentication server 740 may associate the user device authentication public key 728 with the identifier included in the registration response. The authentication server 740 may store the user device authentication public key 728. In response to verifying the user device authentication public key 728, the authentication server 740 may encrypt the provisioning server certificate 764 using the shared secret to obtain an encrypted provisioning server certificate. At 704, the authentication server 740 may send the encrypted provisioning server certificate to the user device 720. The user device 720 may decrypt the encrypted provisioning server certificate to obtain the provisioning server certificate 764. The user device 720 may store the provisioning server certificate 764.

As such, the user device 720 may confidentially register with the authentication server 740 and receive the provisioning server certificate. The user device 720 may use the provisioning server public key of the provisioning server certificate 764 and the user device authentication private key corresponding to the user device authentication public key, which was registered with the authentication server, to generate an authentication shared secret for encrypting the authentication process.

At 705, the user device 720 may send the identifier to the authentication server 740 via the provisioning server 760. The authentication server 740 may identify the user device authentication public key 728 associated with the identifier. The authentication server 740 may generate an authentication shared secret using the user device authentication public key 728 stored at the authentication server 740 and the authentication server private key corresponding to the authentication server public key. The authentication server 740 may generate an authentication request for the user device 720. The authentication request may include an authentication challenge. The authentication server 740 may encrypt the authentication request using the authentication shared secret to obtain an encrypted authentication request. At 706, the authentication server 740 may send the encrypted authentication request to the user device 720.

The user device 720 may generate the authentication shared secret using the authentication server public key of the authentication server certificate 744 and the user device authentication private key corresponding to the user device authentication public key registered with the authentication server 740. The user device 720 may decrypt the encrypted authentication request using the authentication shared secret to obtain the authentication request including the authentication challenge. The user device may processes the authentication request. Processing the authentication request may include adding additional data to the received authentication challenge, verifying a user of user device 720 (e.g., by requiring the authentication information input at registration to be input by the user), and signing the authentication challenge in the authentication request using the user device authentication private key stored at the user device 720. The user device 720 may generate an authentication response including the signed authentication challenge. The user device 720 may encrypt the authentication response using the authentication shared secret to obtain an encrypted authentication response. At 707, the user device 720 may send the encrypted authentication response to the authentication server 740 via the provisioning server 760.

The authentication server 740 may use the authentication shared secret to decrypt the encrypted authentication response to obtain the authentication response. The authentication server 740 may verify the signed challenge using the user device authentication public key 728 stored at the authentication server 740 during registration of the user device 720. For example, the signed challenge may be verified by decrypted, using the user device authentication public key 728, and it may be compared to the authentication challenge of the authentication request. If the signed authentication challenge matches an expected value, then the authentication server may authenticate the user device 720. At 708, the authentication server 740 may send an indication to the provisioning server 760 that the signed challenge has been verified.

If the signed challenge is authenticated, at 709, the provisioning server 760 may send provisioning data to the user device 720. The provisioning sever may encrypt the provisioning data using the authentication shared secret.

As such, the user device authentication public key 728 that was registered with the authentication server 740 during registration may be used to generate an authentication shared secret for encryption of the authentication process. This provides advantages over generating an ephemeral key pair for encrypting authentication messages since generating and using a key pair is computationally intense and requires the use of a large amount of computing resources. Thus, encrypting the authentication request and authentication response using the registered user device authentication public key 726 may use less computing resources compared to a process that generates and uses an ephemeral key pair.

VI. Secure Communication Methods

Embodiments of the invention may utilize any suitable method for secure communication. For example, in some embodiments of the invention, methods in accordance with Opacity specifications can be used to facilitate secure communication between a user device, an authentication server, a provisioning server, and/or any other suitable entity. Table 1, below, includes definitions of terms.

TABLE 1

| | |
|---|---|
| ICC | Mobile phone, Integrated Circuit chip or server |
| IFD | Interface device or client |
| enc_c | Encrypted data generated on client (IFD/Mobile) |
| enc_s | Encrypted data generated on server (ICC) |
| SD_c | Client sensitive Data (payload) |
| SD_s | Server sensitive Data (payload) |
| sID_s | Server (ICC) identifier for the session. Based on Q_bs x_coordinate |
| sID_c | Client (IFD or mobile device) identifier. Truncated value of Q_ec's x_coordinate |
| C_s | Certificate Chain authenticating the Server (ICC) |
| C_s_{n} | Certificate Chain authenticating the Server (ICC) - nth version |
| C_c | Certificate Chain authenticating the client (ICC) |
| d_bc | Client blinding factor |
| d_bs | Server Blinding factor |
| seed | Counter or time, etc. verifiable at ICC or server and proving that blinding factor is fresh. d_bc = PRNG (seed) |
| Q_bc | Blinded Client public key |
| Q_bs | Blinded server public key |
| d_c, Q_c = [d_c]P | Client authentication public key, matched with the corresponding private key: d_c |
| d_s, Q_s = [d_s]P | Server (ICC) authentication public key, matched with the corresponding private key: d_s |
| d_s_{n}, Q_s_{n} | Server (ICC) authentication public and private key, nth version. |
| d_ec, Q_ec = [d_ec]P | client ephemeral public key, matched with the ephemeral private key: d_ec |
| sk_1c, sk_c, sk_1s, sk_s | AES Secure Messaging Session Keys |
| Z, Z_1 | Intermediate Shared secrets (x-coordinate of EC-DH shared resulting point) |
| AEAD, AEAD-1 (sk, data, associated data) | Authenticated Encryption with Associated Data (AES session key SK, data will be encrypted or decrypted. Associated data will remain as is, but controlled for integrity. |
| KDF | Key Derivation Function 800-56C based on AES C_MAC. Applied on concatenated input |
| PRNG | Pseudo random number generator |
| zero_key | AES key where all bytes have a zero value (see 800-56C) |
| PubK (C) | Extract the public key from Cert C |

A. Methods Assuming a Pre-Loaded Server Certificate

A method for secure communication using a client computer that is pre-loaded with a server computer certificate is described below. The client computer may maintain data prior to the communication. For example, the client computer can maintain a number (n) server authentication public keys (Q_s_{n}) and server computer certificate chains (C_s_{n}). The client computer can also maintain client sensitive data (SD_c), which may include data usable by a server computer to authenticate the client computer. In addition, the client computer can maintain a client computer certificate chain (C_c) and a client authentication key pair including a client authentication public key (Q_c) and a corresponding client authentication private key (d_c). Furthermore, the client computer can maintain a seed value (seed) that is typically verifiable by the server computer.

The server computer may also maintain data prior to the communication. For example, the server computer can maintain a number (n) server computer certificate chains (C_s_{n}), each including a server authentication public key (Q_s_{n}) and the server computer maintaining a corresponding server authentication private key (d_s_{n}). The server computer can also maintain a next server authentication key pair including a next server authentication public key (Q_s_{n+1}) and a next server authentication private key (d_s_{n+1}). The server computer can also maintain an initialization value (IV) and server sensitive data (SD_s), which may include data usable by a client computer to authenticate the server computer.

At step 1, the client computer generates a client blinding factor (d_bc) using a PRNG function with the seed value as an input.

At step 2, the client computer generates a blinded client authentication public key (Q_bc) using the client blinding factor, an initialization value (d_iv), and the client authentication public key.

At step 3, the client computer generates a first shared secret (Z_1) using the client authentication public key, the client blinding factor, and the server authentication public key corresponding to the server computer for which communication is intended (Q_s_{n}).

At step 4, a client session identifier is generated using the blinded client authentication public key.

At step 5, a first client session key is derived using the first shared secret, a server identifier (ID_s), and the client session identifier.

At step 6, the first client session key is used to encrypt (AEAD) the client sensitive data, the client certificate chain, either the client blinding factor or the seed, some client padding data (PAD_c), and the blinded client authentication public key. The result is encrypted client data (enc_c).

At step 7, the first shared secret and the first client session key are zeroized (i.e., erased).

At step 8, the blinded client authentication public key ad the client encrypted data are sent to the server computer.

At step 9, the server computer validates that the blinded client authentication public key belongs to the correct elliptic curve domain.

At step 10, the server computer generates the same first shared secret, but using the server authentication private key, the initialization value, and the blinded client authentication public key.

At step 11, the server computer determines the client session identifier from the blinded client authentication public key.

At step 12, the server computer derives the first client session key using the first shard secret, the server identifier, and the client session identifier.

At step 13, the server computer decrypts (AEAD-1) the encrypted client data using the first client session key to obtain the client sensitive data, the client certificate chain, the client blinding factor or seed, and the client padding data.

At step 14, the server computer zeroizes the first client session key and the first shard secret.

At step 15, if the client blinding factor was not included in the encrypted client data decrypted at step 13, the server computer derives it from the seed using a PRNG function.

At step 16, the server computer extracts the client authentication public key from the client certificate. The client certificate is also validated.

At step 17, the blinded client authentication public key received from the client computer is compared to a combination of the client blinding factor and the client authentication public key. If they match, the server computer can authenticate the client computer.

At step 18, the server computer generates a server blinding factor (d_bs).

At step 19, a second shared secret (Z) is generated using the second blinding factor, the next server authentication private key, and the blinded client authentication public key.

At step 20, a blinded server authentication public key (Q_bs) is generated using the server authentication public key and the server blinding factor.

At step 21, a server session identifier (sID_s) is generated using the blinded server authentication public key.

At step 22, a server session key (sk_s) and a second client session key (sk_c) are generated using the second shared secret, the server session identifier, and the client session identifier.

At step 23, the server blinding factor, the next server certificate chain, the server sensitive data, and a server pad (PAD_s) are encrypted using the server session key to generate encrypted server data (enc_s).

At step 24, the server session key and the second shared secret are zeroized.

At step 25, the blinded server authentication public key and the encrypted server data are sent to the client computer.

At step 26, the client computer validates that the blinded server authentication public key belongs to the correct EC domain.

At step 27, the client computer determines the second shared secret using a combination of the client authentication private key and the client blinding factor, and the blinded server authentication public key.

At step 28, the client computer determines the server session identifier using the blinded server computer public key.

At step 29, the client computer derives the server session key and the second client session key using the second shared secret, the server session identifier, and the client session identifier.

At step 30, the client computer zeroizes the second session key and the client blinding factor.

At step 31, the client computer decrypts (AEAD-1) the encrypted server data using the server session key to obtain the server blinding factor, the next server certificate chain, the server sensitive data, and the server pad.

At step 32, the client computer extracts the next server authentication public key from the next server certificate chain.

At step 33, the client computer validates that the next server certificate chain belongs to the correct elliptic curve domain.

At step 34, the client computer validates that the combination of the next server authentication public key and the server blinding factor equals the blinded server authentication public key.

At step 35, the client computer and sever computer can end communication or continue secure messaging using the second client session key and/or the server session key.

B. Methods Including Transfer of a Server Certificate

Another method for secure communication is described below. The method uses a client computer that may not be pre-loaded with a server computer certificate. The client computer may maintain data prior to the communication. For example, the client computer can maintain a client computer certificate chain (C_c) and a client authentication key pair including a client authentication public key (Q_c) and a corresponding client authentication private key (d_c).

The server computer may also maintain data prior to the communication. For example, the server computer can maintain a server computer certificate chain (C_s), including a server authentication public key (Q_s) and the server computer maintaining a corresponding server authentication private key (d_s). The server computer can also maintain server sensitive data (SD_s), which may include data usable by a client computer to authenticate the server computer.

At step 1, the client computer generates a client blinding factor (d_bc).

At step 2, the client computer combines the blinding factor with the client authentication public key to determine a blinded client authentication public key (Q_bc).

At step 3, the client computer determines a client session identifier (sID_c) using the blinded client authentication public key.

At step 4, the client computer sends the blinded client authentication public key to the server computer.

At step 5, the server computer ensures that the blinded client authentication public key belongs to the correct elliptic curve (EC) domain.

At step 6, the server computer generates a server blinding factor (d_bs).

At step 7, the server computer generates a shared secret (Z) using a combination of the server authentication private key and the server blinding factor, and the blinded client authentication public key.

At step 8, the server computer combines the server authentication public key and the server blinding factor to determine a blinded server authentication public key (Q_bs).

At step 9, the server computer determines a client session identifier (sID_c) using the blinded client authentication public key.

At step 10, the server computer determines a server session identifier (sID_s) using the blinded server authentication public key.

At step 11, the server computer generates a server session key and a client session key using the shared secret, the client session identifier, and the server session identifier.

At step 12, the server computer encrypts the server blinding factor, the server certificate chain, the server sensitive data, and a server pad (PAD_s) using the server session key to determine server encrypted data (enc_s).

At step 13, the server session key and the shared secret are zeroized.

At step 14, the blinded server authentication public key and the server encrypted data are sent to the client computer.

At step 15, the client computer validates that the blinded server authentication public key belongs to the correct EC domain.

At step 16, the client computer determines the shared secret using a combination of the client authentication private key and the client blinding factor, and the blinded server authentication public key.

At step 17, the client computer determines the server session identifier using the blinded server authentication public key.

At step 18, the client computer determines the server session key and the client session key using the shared secret, the server session identifier, and the client session identifier.

At step 19, the client computer zeroizes the shared secret and the client blinding factor.

At step 20, the client computer decrypts the server encrypted data using the server session key to obtain the server blinding factor, the server certificate chain, the server sensitive data, and the server pad.

At step 21, the client computer extracts the server authentication public key from the server certificate chain.

At step 22, the client computer validates that the server authentication public key belongs to the correct EC domain.

At step 23, the client computer verifies the server certificate chain.

At step 24, the client computer ensures that the combination of the server blinding factor and the server authentication public key is equal to the blinded server authentication public key received from the server computer.

At step 25, the server blinding factor is zeroized.

At step 26, if at step 24 the check is successful, the server computer is authenticated at the client computer.

At step 27, client encrypted data (enc_c) is generated by encrypting the client blinding factor, the client certificate chain, the client sensitive data, and a client pad (PAD_c) using the client session key.

At step 28, the client computer sends the client encrypted data to the server computer.

At step 29, the server computer decrypts the client encrypted data using the client session key to obtain the client blinding factor, the client certificate chain, the client sensitive data, and the client pad.

At step 30, the server computer extracts the client authentication public key from the client certificate chain and validates the client certificate chain.

At step 31, the server computer ensures that the combination of the client blinding factor and the client authentication public key matches the blinded client authentication public key received from the client computer. If they match, at step 33 the client computer is authenticated by the server computer.

At step 32, the client blinding factor is zeroized.

At step 34, the client computer and sever computer can end communication or continue secure messaging using the second client session key and/or the server session key.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method comprising:
   encrypting, by an authentication server, an authentication challenge to obtain an encrypted authentication challenge;
   sending, by the authentication server, the encrypted authentication challenge to a user device, wherein the user device generates a blinded user device authentication public key using a user device authentication public key and a user device blinding factor and encrypts the user device blinding factor using a first shared secret to obtain an encrypted user device blinding factor;
   receiving, by the authentication server, an encrypted authentication response from the user device;
   receiving, by the authentication server, the blinded user device authentication public key and the encrypted user device blinding factor from the user device;
   generating, by the authentication server, the first shared secret using an authentication server private key and the user device authentication public key;
   decrypting, by the authentication server, the encrypted authentication response using the first shared secret to obtain an authentication response including the authentication challenge;
   decrypting, by the authentication server, the encrypted user device blinding factor using the first shared secret to obtain the user device blinding factor;
   verifying, by the authentication server, the blinded user device authentication public key using the user device blinding factor and the user device authentication public key; and
   authenticating, by the authentication server, the user device based on the authentication response and whether or not the blinded user device authentication public key is verified.

2. The method of claim 1, wherein the authentication challenge is encrypted using the user device authentication public key, the user device authentication public key having been previously obtained from the user device via a registration process.

3. The method of claim 2, wherein the registration process comprises:
   receiving, from the user device, a signed user device authentication public key generated by the user device signing the user device authentication public key using a user device attestation private key, the user device attestation private key corresponding to a user device attestation public key.

4. The method of claim 3, wherein the signed user device authentication public key is received in an encrypted registration response, the method further comprising:
   decrypting the encrypted registration response to obtain the signed user device authentication public key; and
   validating the signed user device authentication public key using the user device attestation public key.

5. The method of claim 1, wherein the authentication challenge is a signed authentication challenge, wherein the user device generated the signed authentication challenge by signing the authentication challenge using a user device authentication private key corresponding to the user device authentication public key, wherein the authenticating of the user device includes verifying the signed authentication challenge using the user device authentication public key.

6. The method of claim 1, further comprising receiving, by the authentication server, an identifier from the user device, the identifier associated with the user device authentication public key.

7. The method of claim 5, further comprising sending, by the authentication server, provisioning data to the user device in response to verifying the signed authentication challenge.

8. A computer-implemented method comprising:
   receiving, by a user device, an encrypted authentication challenge from an authentication server;
   decrypting, by the user device, the encrypted authentication challenge to obtain an authentication challenge;
   generating, by the user device, a user device blinding factor;
   generating, by the user device, a blinded user device authentication public key using a user device authentication public key and the user device blinding factor;
   generating, by the user device, a first shared secret using a user device authentication private key corresponding to the user device authentication public key and an authentication server public key;
   encrypting, by the user device, an authentication response including the authentication challenge using the first shared secret to obtain an encrypted authentication response;
   encrypting, by the user device, the user device blinding factor using the first shared secret to obtain an encrypted user device blinding factor; and
   sending, by the user device, the encrypted authentication response and the encrypted user device blinding factor to the authentication server, wherein the authentication server authenticates the user device based on the authentication response, wherein the authentication server verifies the blinded user device authentication public key using the user device blinding factor and the user device authentication public key.

9. The method of claim 8, further comprising generating, by the user device, a signed authentication challenge by signing the authentication challenge using the user device authentication private key, wherein the authentication challenge of the authentication response is the signed authentication challenge.

10. The method of claim 8, further comprising sending, by the user device, an identifier to the authentication server, the identifier associated with the user device authentication public key.

11. The method of claim 8, wherein the authentication server generates the first shared secret using the user device authentication public key and an authentication server private key, and decrypts the encrypted authentication response using the first shared secret.

12. The method of claim 8, further comprising:
receiving, by the user device, an encrypted authentication server certificate from the authentication server; and
decrypting, by the user device, the encrypted authentication server certificate using the first shared secret to obtain an authentication server certificate, the authentication server certificate including the authentication server public key.

13. The method of claim 8, further comprising receiving, by the user device, encrypted provisioning data, wherein the user device decrypts the encrypted provisioning data using the first shared secret to obtain provisioning data.

14. The method of claim 8, further comprising:
signing, by the user device, the user device authentication public key using a user device attestation private key to obtain a signed user device authentication public key, the user device attestation private key corresponding to a user device attestation public key;
encrypting, by the user device, the signed user device authentication public key to obtain an encrypted registration response; and
sending, by the user device, the encrypted registration response to the authentication server.

15. The method of claim 14, further comprising encrypting, by the user device, a user device attestation certificate including the user device attestation public key to obtain an encrypted user device attestation certificate, wherein the encrypted registration response includes the encrypted user device attestation certificate.

16. The method of claim 8, further comprising:
receiving, by the user device, a blinded authentication server public key and an encrypted authentication server certificate from the authentication server;
generating, by the user device, a second shared secret using the blinded authentication server public key and the user device authentication private key;
decrypting, by the user device, the encrypted authentication server certificate using the second shared secret to obtain an authentication server certificate including the authentication server public key;
encrypting, by the user device, the user device authentication public key using the second shared secret to obtain an encrypted user device authentication public key; and
sending, by the user device, the encrypted user device authentication public key to the authentication server.

17. The method of claim 8, further comprising receiving, by the user device, a provisioning server certificate from the authentication server, the provisioning server certificate including the authentication server public key.

18. The method of claim 8, further comprising:
receiving, by the user device, input from a user of the user device;
authenticating, by the user device, the user based on the input; and
generating, by the user device, the user device authentication private key and the user device authentication public key in response to authenticating the user.

19. A computer system, comprising:
a processor; and
a non-transitory computer-readable storage medium coupled to the processor and storing code executable by the processor for performing a method comprising:

encrypting an authentication challenge to obtain an encrypted authentication challenge;
sending the encrypted authentication challenge to a user device, wherein the user device is configured to generate a blinded user device authentication public key using a user device authentication public key and a user device blinding factor and encrypt the user device blinding factor using a first shared secret to obtain an encrypted user device blinding factor;
receiving an encrypted authentication response from the user device;
receiving the blinded user device authentication public key and the encrypted user device blinding factor from the user device;
generating the first shared secret using an authentication server private key and the user device authentication public key;
decrypting the encrypted authentication response using the first shared secret to obtain an authentication response including the authentication challenge;
decrypting the encrypted user device blinding factor using the first shared secret to obtain the user device blinding factor;
verifying the blinded user device authentication public key using the user device blinding factor and the user device authentication public key; and
authenticating the user device based on the authentication response and whether or not the blinded user device authentication public key is verified.

20. The computer system of claim 19, wherein the method further comprises:
receiving, from the user device, a signed user device authentication public key generated by the user device signing the user device authentication public key using a user device attestation private key, the user device attestation private key corresponding to a user device attestation public key, wherein the authentication challenge is encrypted using the user device authentication public key;
decrypting an encrypted registration response to obtain the signed user device authentication public key, wherein the signed user device authentication public key is received in the encrypted registration response; and
validating the signed user device authentication public key using the user device attestation public key.

21. A computer system, comprising:
a processor; and
a non-transitory computer-readable storage medium coupled to the processor and storing code executable by the processor for performing a method comprising:
receiving an encrypted authentication challenge from an authentication server;
decrypting the encrypted authentication challenge to obtain an authentication challenge;
generating a user device blinding factor;
generating a blinded user device authentication public key using a user device authentication public key and the user device blinding factor;
generating a first shared secret using a user device authentication private key corresponding to the user device authentication public key and an authentication server public key;
encrypting an authentication response including the authentication challenge using the first shared secret to obtain an encrypted authentication response;

encrypting the user device blinding factor using the first shared secret to obtain an encrypted user device blinding factor; and sending the encrypted authentication response and the encrypted user device blinding factor to the authentication server, wherein the authentication server authenticates a user device based on the authentication response, wherein the authentication server verifies the blinded user device authentication public key using the user device blinding factor and the user device authentication public key.

22. The computer system of claim 21, wherein the method further comprises generating a signed authentication challenge by signing the authentication challenge using the user device authentication private key, wherein the authentication challenge of the authentication response is the signed authentication challenge.

* * * * *